US012809391B2

(12) United States Patent
Sun

(10) Patent No.: US 12,809,391 B2
(45) Date of Patent: Nov. 24, 2026

(54) SYSTEMS AND METHODS FOR BUILDING AND CONTROLLING A SELF-DRIVING ROBOT

(71) Applicant: Sunrise Technology Inc., Stony Brook, NY (US)

(72) Inventor: Yu Sun, Stony Brook, NY (US)

(73) Assignee: Sunrise Technology Inc., Stony Brook, NY (US)

( * ) Notice: Subject to any disclaimer, the term of this patent is extended or adjusted under 35 U.S.C. 154(b) by 100 days.

(21) Appl. No.: 18/914,641

(22) Filed: Oct. 14, 2024

(65) Prior Publication Data

US 2025/0123630 A1 Apr. 17, 2025

Related U.S. Application Data

(60) Provisional application No. 63/589,817, filed on Oct. 12, 2023.

(51) Int. Cl.
*G05D 1/60* (2024.01)
*G05D 101/15* (2024.01)

(52) U.S. Cl.
CPC ........... *G05D 1/60* (2024.01); *G05D 2101/15* (2024.01)

(58) Field of Classification Search
CPC ............................ G05D 1/60; G05D 2101/15
USPC ............................................................ 701/23
See application file for complete search history.

(56) References Cited

U.S. PATENT DOCUMENTS

| | | | | |
|---|---|---|---|---|
| 11,400,587 | B2 * | 8/2022 | Levine | B25J 9/161 |
| 11,644,834 | B2 * | 5/2023 | Ditty | B60W 60/0015 701/23 |
| 11,644,842 | B1 * | 5/2023 | Phan | G05D 1/0212 701/23 |
| 11,654,552 | B2 * | 5/2023 | Groz | B25J 9/163 700/245 |
| 11,782,435 | B2 * | 10/2023 | Cella | G06Q 30/0265 701/23 |
| 12,346,119 | B2 * | 7/2025 | Sajjan | B60W 30/095 |
| 12,430,702 | B2 * | 9/2025 | Tremblay | B25J 9/161 |
| 12,578,733 | B2 * | 3/2026 | Lynch | G05D 1/495 |
| 2017/0140259 | A1 * | 5/2017 | Bergstra | B25J 9/161 |
| 2019/0228294 | A1 * | 7/2019 | Hwang | G06N 3/063 |
| 2019/0228495 | A1 * | 7/2019 | Tremblay | B25J 9/161 |
| 2021/0252698 | A1 * | 8/2021 | Paxton | B25J 9/161 |
| 2021/0390653 | A1 * | 12/2021 | Tremblay | B25J 9/161 |
| 2022/0187847 | A1 * | 6/2022 | Cella | G05B 19/41885 |

(Continued)

*Primary Examiner* — Luis A Martinez Borrero
(74) *Attorney, Agent, or Firm* — Haynes and Boone, LLP

(57) ABSTRACT

Systems and methods for controlling self-driving robots are provided. Data from a plurality of sensors, associated with a robotic device, is received by a plurality of neural network models. Each neural network model of the plurality of neural network models receives a subset of the data from the plurality of sensors. The plurality of neural network models generate, based on the data from the plurality of sensors, a plurality of outputs. Each output of the plurality of outputs is generated by a particular neural network model of the plurality of neural network models. Each output corresponds to a respective subset of data received by the particular neural network model of the plurality of neural network models. Thereafter, an output from the plurality of outputs is selected, where the output includes data for controlling the robotic device. The robotic device is then controlled based on the output.

20 Claims, 24 Drawing Sheets

(56) References Cited

U.S. PATENT DOCUMENTS

| | | | | |
|---|---|---|---|---|
| 2023/0112004 | A1* | 4/2023 | Hari | B60W 50/06 701/23 |
| 2023/0150529 | A1* | 5/2023 | Stenson | B60W 40/02 701/23 |
| 2023/0205201 | A1* | 6/2023 | Cella | G06Q 30/0265 701/123 |
| 2023/0213945 | A1* | 7/2023 | Sajjan | B60W 30/095 701/28 |
| 2024/0028909 | A1* | 1/2024 | Wang | G06N 3/0455 |
| 2024/0180383 | A1* | 6/2024 | Yamane | A47L 11/4011 |
| 2025/0061305 | A1* | 2/2025 | Wang | G06N 3/043 |
| 2025/0224737 | A1* | 7/2025 | Bohez | G06N 3/0499 |
| 2025/0348085 | A1* | 11/2025 | Ho | G05D 1/243 |
| 2026/0010835 | A1* | 1/2026 | Piazentin Ono | G06N 20/20 |
| 2026/0017543 | A1* | 1/2026 | Bao | G06F 40/40 |
| 2026/0064125 | A1* | 3/2026 | Lynch | G05D 1/495 |

* cited by examiner

SYSTEMS AND METHODS FOR BUILDING AND CONTROLLING A SELF-DRIVING ROBOT

CROSS-REFERENCE TO RELATED APPLICATIONS

This application claims the benefit of U.S. Provisional Application No. 63/589,817, filed Oct. 12, 2023, the disclosure of which is hereby incorporated by reference in its entirety.

FIELD OF THE INVENTION

The disclosure generally relates to self-driving robots, and more particularly to systems and methods for controlling self-driving robots.

BACKGROUND

Autonomous robots (or autonomous vehicles) have experienced rapid technological advancement due in large part to advancements in artificial intelligence (AI). Such robots (or vehicles) may be equipped with, or otherwise in communication with, a plurality of sensors that provide vast amounts of information about the vehicle and/or a surrounding environment. Using data provided by the sensors, AI models can process vast amounts of data in real time, providing for autonomous vehicle control in dynamically changing environments. However, accurate and efficient processing of such data, as well as systems and platforms to develop and test AI models, remains challenging. Thus, existing systems and methods have not proved entirely satisfactory in all respects.

Figure 1:
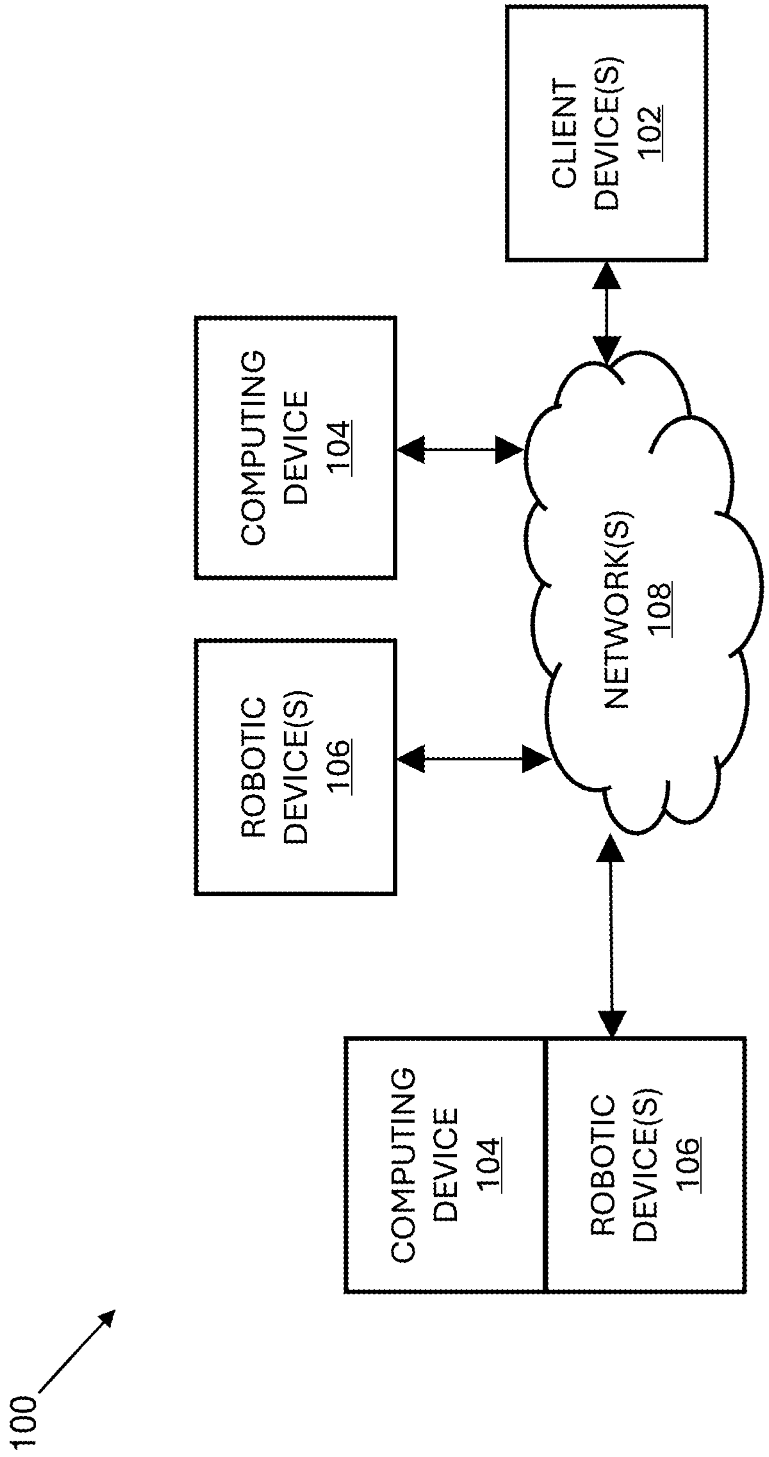
FIG. 1 is a schematic view illustrating a system adapted for controlling self-driving robots, in accordance with some embodiments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The following disclosure provides different embodiments, or examples, for implementing different features of the provided subject matter. Specific examples of components and arrangements are described below to simplify the present disclosure. These are, of course, merely examples and are not intended to be limiting. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms “including” and “comprising” are used in an open-ended fashion, and thus should be interpreted to mean “including, but not limited to . . . ”. Also, the term “couple” or “couples” is intended to mean either an indirect or direct connection. Thus, if a first device couples to a second device, that connection may be through a direct connection, or through an indirect connection via other devices and connections.

As used herein, the term “network” may comprise any hardware or software-based framework that includes any artificial intelligence network or system, neural network or system and/or any training or learning models implemented thereon or therewith. Further, the term “module” may comprise hardware or software-based framework that performs one or more functions. In some embodiments, the module may be implemented on one or more neural networks. Also, the term “autonomous” or “autonomously” may be used to describe operations performed without human intervention or input, such as operations performed by a computing device, network, module, neural network engine, or combinations thereof. For purposes of this discussion, “real-time” may be defined as any process which has an immediate request, processing, and response workflow. In some embodiments, real-time may also be defined as a process that occurs while an application or service is running (e.g., during runtime).

As previously noted, autonomous robots have experienced rapid technological advancement due, in large part, to advancements in artificial intelligence (AI). Generally, autonomous robots (or autonomous vehicles, as one example) may be equipped with, or otherwise in communication with, a plurality of sensors that provide vast amounts of information about the vehicle and/or a surrounding environment. AI models can be used to process these vast amounts of data, collected and/or provided by the sensors, in real-time to provide for autonomous robot control in dynamically changing environments. However, accurate and efficient processing of such data, as well as systems and platforms to develop and test AI models, remains challenging. Thus, existing systems and methods have not proved entirely satisfactory in all respects.

Embodiments of the disclosure offer advantages over the existing art, though it is understood that other embodiments may offer different advantages, not all advantages are necessarily discussed herein, and no particular advantage is required for all embodiments. For example, embodiments discussed herein include systems and methods for controlling self-driving robots, thereby effectively overcoming various shortcomings of existing implementations. In various implementations, and for purposes of the present disclosure, autonomous robots (or robotic devices) may have the form of a toy car. However, it will be understood that aspects of the present disclosure are not limited to robotic devices having a particular form. In some embodiments, autonomous robots may have alternate forms such as robots suitable for use as a humanoid robot, industrial robot, service robot, factory robot, military robot, mining robot, drone, automobile, boat, security monitoring device, medical device, or other type of vehicle or robotic device.

In some embodiments, the disclosed autonomous robot may include or be communicatively coupled to multiple sensors. In some cases, the sensors, or other components of the robot, may be attached to the robot using custom 3D printed components. By way of example, and in some embodiments, the sensors may include a camera, a depth camera, radar, LiDAR, GPS, inertial sensors, other suitable sensors, or combinations thereof. Generally, the data provided by the sensors may be used to identify the location of the autonomous robot, the environment surrounding the autonomous robots (e.g., including obstacles in the environment), and predict or otherwise control the steering, throttle, speed, direction, etc., of the autonomous robot. In some embodiments, the sensor data may be provided to a computing device that includes a neural network engine and an automatic drive engine. In some examples, the neural network engine may include multiple neural network models and an agent module. For purposes of the present disclosure, the neural network models may include machine learning (ML) models, deep learning (DL) models, and/or other suitable AI models, as discussed in more detail below. Each neural network model may receive a subset of data from one or more of the sensors and generate an output that includes steering and/or throttle data. In some cases, the subset of data received by each neural network model may be different from subsets of data received by the other neural network models as each subset of data may include data from different combinations of sensors. In some embodiments, the agent module may select an output of one of the neural network models and transmit the output to the automatic drive engine. The automatic drive engine, in turn, may convert the steering and/or throttle data in the output into control data for controlling the autonomous robot. In various embodiments, this process may repeat iteratively to control the driving direction and speed of the autonomous robot.

Additional embodiments and advantages will become evident in the discussion that follows and with reference to the accompanying figures. As one example, embodiments of the present disclosure provide a client graphical user interface (GUI) that is compatible with, and which can communicate with, diverse hardware systems mounted on and used to control the autonomous robot. This may be particularly useful for testing AI models across diverse hardware systems and/or for provider a user with the option to choose a particular hardware system based on availability or preference.

Referring now to FIG. 1, illustrated therein is an exemplary embodiment of a system 100 adapted for implementing one or more embodiments disclosed herein for controlling self-driving robots.

In some embodiments, the system 100 may include one or more client devices 102, computing devices 104, and robotic devices 106. Although only one or two of each is illustrated, it will be understood that various embodiments may include any number of client devices 102, computing devices 104, and robotic devices 106. In various examples, the client devices 102, computing devices 104, and robotic devices 106 are coupled to a network 108, for example by way of network communication devices, as discussed below. As shown, some of the computing devices 104 and robotic devices 106 may be separate devices, each independently coupled to the network 108. In other examples, the robotic device 106 may include the computing device 104 (e.g., the computing device 104 may be mounted onto or otherwise coupled to the robotic device 106), or be a single device 106/104, where the combination robotic device 106/computing device 104 is then coupled to the network 108.

In some embodiments, the client devices 102 may include any type of computing device such as a laptop, a desktop, a mobile computing device, a smart phone, a tablet, a PC, a wearable computing device (e.g., such as a smart watch, virtual reality headset, eyeglasses that incorporate computing devices, implantable computing devices, etc.), and/or any other computing device having computing and/or communications capabilities in accordance with the described embodiments. Client devices 102 may be operated by a user and may be configured to transmit, receive, manipulate data, execute various applications, and communicate with other devices connected to the network 108.

By way of example, client devices 102 generally may provide one or more client programs, such as system programs and application programs to perform various computing and/or communications operations. Example system programs may include, without limitation, an operating system (e.g., MICROSOFT® OS, UNIX® OS, LINUX® OS, macOS®, JavaOS, and others), run-time environments (e.g., such as for NVIDIA® Jetson® computing boards, Google Coral, Intel Movidius Neural Compute Stick, BeagleBone AI, Xilinx Zynq UltraScale+ MPSoC, Qualcomm Snapdragon, Arduino Portenta H7), device drivers, programming tools, utility programs, software libraries, application programming interfaces (APIs), and so forth. Example application programs may include, without limitation, an autonomous robot or vehicle control application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs may display various graphical user interfaces (GUIs) to present information to and/or receive information inputted by one or more users of client devices 102.

As shown, client devices 102 are coupled to one or more networks 108, the one or more networks 108 further coupled to robotic devices 106 and computing devices 104. The computing devices 104 may include a neural network engine configured to implement one or more of the functionalities of the various embodiments of the present disclosure, as described in more detail below. In some instances, computing devices 104 may be a server conducive to processing and storing large amounts of data. Similarly, the robotic devices 106 may be configured to implement one or more of the functionalities of the embodiments of the present disclosure, as described below. Further, in various embodiments, the system 100 may be structured, arranged, and/or configured such that the functionalities of the computing device 104, including functionalities provided by the neural network engine, are provided alternatively and/or additionally by one or both of the client devices 102 and the robotic devices 106.

In some embodiments, the network 108 of the system 100 may be implemented as a single network or as a combination of multiple networks. For example, in various embodiments, the network 108 may include the Internet and/or one or more intranets, landline networks, wireless networks, cellular networks, satellite networks, private or local area networks, wide area networks, and/or other appropriate types of networks. In some examples, the client devices 102, the computing devices 104, and/or the robotic devices 106 may communicate through the network 108 via cellular communication, by way of one or more user network communication devices. In other examples, the client devices 102, the computing devices 104, and/or the robotic devices 106 may communicate through the network 108 via wireless communication (e.g., via a WiFi network), by way of one or more user network communication devices. In yet other examples, the client devices 102, the computing devices 104, and/or the robotic devices 106 may communicate through the network 108 via any of a plurality of other radio and/or telecommunications protocols, by way of one or more user network communication devices. In still other embodiments, the client devices 102, the computing devices 104, and/or the robotic devices 106 may communicate through the network 108 using a Short Message Service (SMS)-based text message, by way of one or more user network communication devices.

In some embodiments, the robotic devices 106 include one or more computing boards. The computing boards may provide a complete set of computer components integrated onto a single circuit board. For example, in various embodiments, the computing boards may include one or more processors (e.g., CPU and/or GPU), a system on a chip (SoC), a memory, input/output (I/O) interfaces, USB ports, Ethernet ports, wireless networking chips (e.g., such as an IEEE 802.11 chipset, a Bluetooth low-energy module), as well as other appropriate features. By way of example, the computing boards may include an a Jetson Nano board, a Raspberry Pi® single-board computer, or other type of computing board. In some embodiments, the robotic devices 106 also include one or more microcontroller boards, such as an Arduino board, or other microcontroller board(s). Further, in various cases, the computing boards and microcontroller boards embedded within the robotic devices 106 may be coupled to the network 108, for example by way of network communication devices. In some embodiments, such as when the computing boards are embedded within the robotic devices 106, the computing boards may serve as the computing device 104. In some examples, the robotic devices 106 may include a handheld computing device executing one or more applications to provide for streaming video to a client, remote control, local control, neural network inference, interfacing with the computing boards, data recording, etc. In some embodiments, the robotic devices 106 include, or are communicatively coupled to, a plurality of sensors. In some cases, the sensors, as well as other components (e.g., such as the handheld computing device), may be attached to the robotic devices 106 using custom 3D printed components. As noted above, the sensors may include a camera, a depth camera, radar, LiDAR, GPS, inertial sensors, other suitable sensors, or combinations thereof. In various examples, the sensors may be coupled to the robotic devices 106 in various locations, including front, back, sides, top, and bottom of the robotic devices 106 or be included within computing device 104. In some embodiments, the data provided by the sensors may be communicated to the computing boards. Alternatively, in some embodiments, the data provided by the sensors may be communicated to the client devices 102 and/or the computing device 104, over the network 108, to control the robotic device 106.

In some embodiments, the computing device 104 may be a server or another computing device that includes software and hardware for processing large amounts of data in real-time. As described in more detail below, the computing device 104 may include a neural network engine including a plurality of neural network models. In some embodiments, the computing device 104 may provide and execute one or more programs, such as operating system (e.g., MICROSOFT® OS, UNIX® OS, LINUX® OS, macOS®, JavaOS, and others), run-time environments (e.g., such as for NVIDIA® Jetson® computing boards), device drivers, programming tools, utility programs, software libraries, APIs, and so forth. In some embodiments, the computing device 104 includes a database used to store and maintain various types of information for use by the system 100 and may comprise or be implemented by various types of computer storage devices (e.g., servers, memory) and/or database structures (e.g., relational, object-oriented, hierarchical, dimensional, network) in accordance with the described embodiments. It can be appreciated that the computing device 104 may be deployed in other ways and that the operations performed and/or the services provided by the computing device 104 may be combined or separated for a given implementation and may be performed by a greater number or fewer number of servers. Further, as previously noted, the operations performed and/or the services provided by the computing device 104 may be performed by one or both of the client devices 102 and the robotic devices 106. Thus, in at least some cases, one or both of the client devices 102 and the robotic devices 106 may include the computing device 104. For instance, as shown in FIG. 1, the computing device 104 may be mounted onto or otherwise coupled to at least one of the robotic devices 106.

Figure 2A:
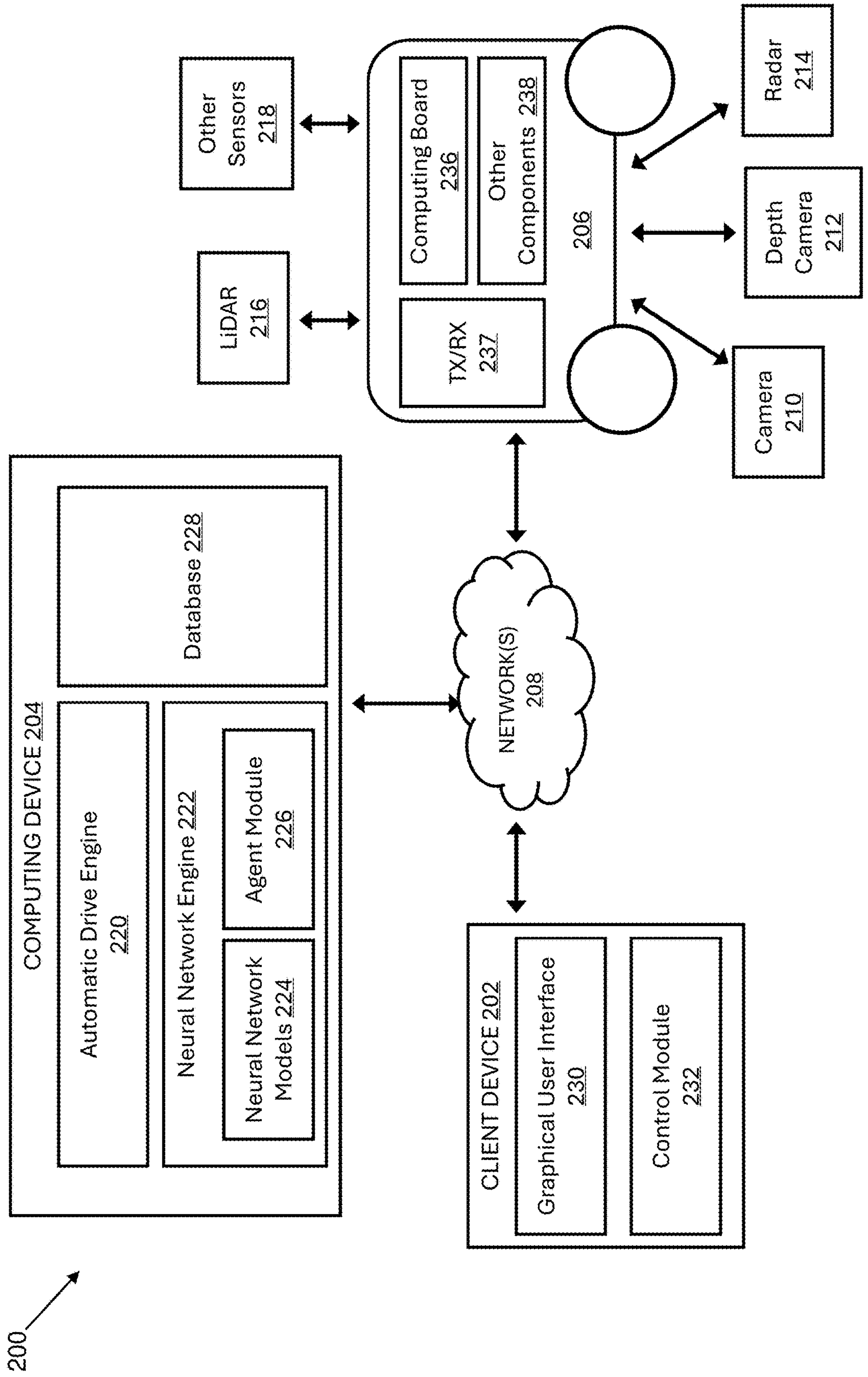
FIGS. 2A, 2B, and 2C are schematic views illustrating more detailed views of various aspects of the system adapted for controlling self-driving robots, as shown in FIG. 1, in accordance with some embodiments.
Figure 2B:
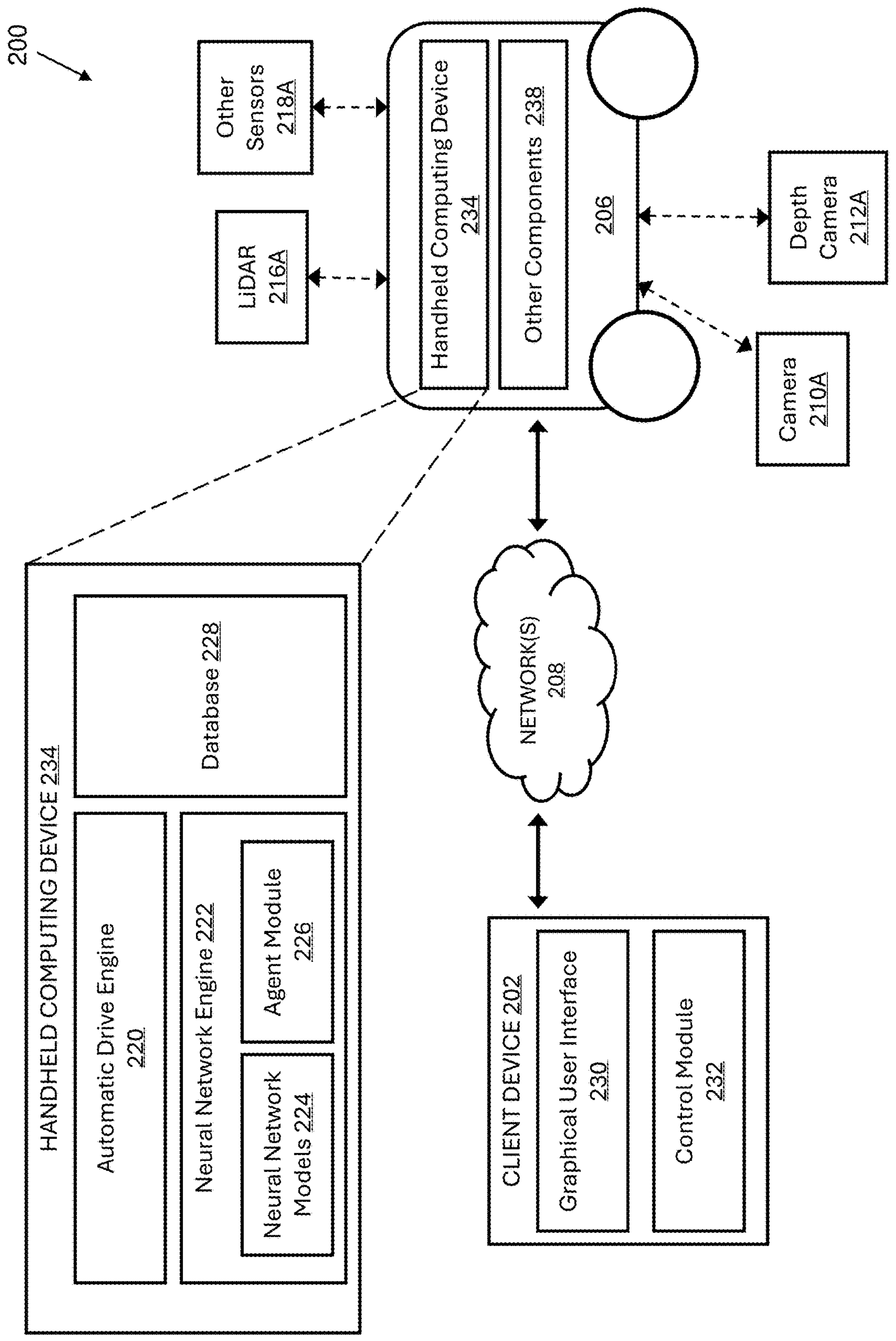
Figure 2C:
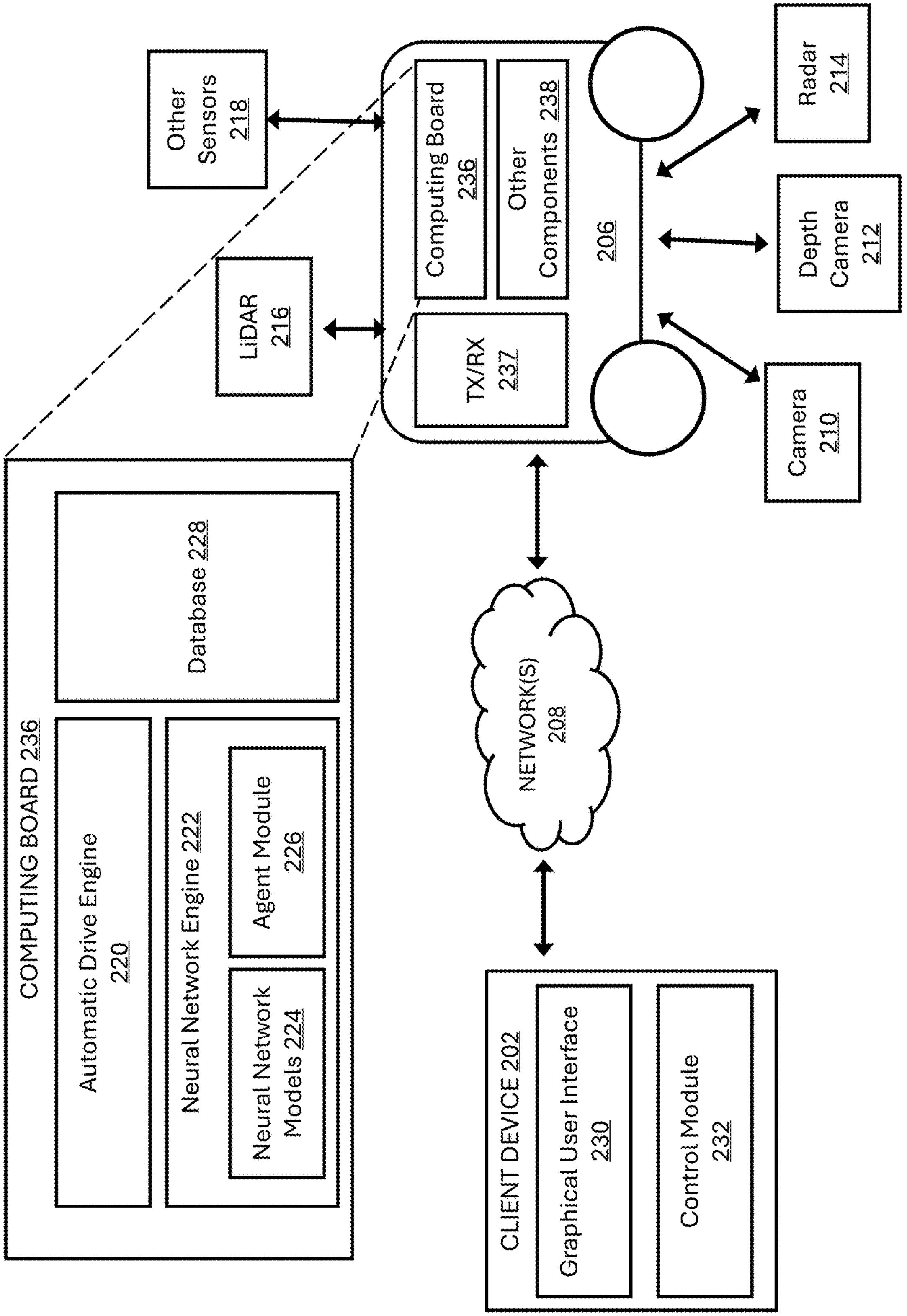

For a better understanding of the various embodiments disclosed herein, reference is now made to FIGS. 2A, 2B, and 2C, which show exemplary embodiments of a system 200 adapted for implementing one or more embodiments disclosed herein for controlling self-driving robots. In particular, the system 200 provides more detailed views of portions of the system of FIG. 1 that are configured to implement one or more of the functionalities of the various embodiments of the present disclosure. In some embodiments, the examples of FIGS. 2A, 2B, and 2C illustrate various implementations that may be optimized for different purposes. Further, the various implementations of FIGS. 2A, 2B, and 2C include diverse configurations for how the functionalities of the computing device 104 (including functionalities provided by the neural network engine) are provided. In some examples, the implementation of FIG. 2A may be optimized for use with cloud-based neural network engines or platforms, including cloud-based training of neural network models. In some cases, the implementation of FIG. 2B may be optimized for lightweight, portable applications with integrated cameras, radars, sensors, and communication modules. In some examples, the implementation of FIG. 2C may be optimized for high-performance computing tasks, advanced AI inference, and multi-sensor integration suitable for complex and computationally intensive robotic systems.

In each of the implementations of FIGS. 2A, 2B, and 2C, the system 200 includes a client device 202, which may be substantially the same as the client device 102, discussed above. In the implementation of FIG. 2A, the system 200 further includes a computing device 204, which may be the computing device 104, discussed above. The computing device 204 of FIG. 2A may be a cloud-based computing device designed for intensive and efficient computations and large-scale storage, in some examples. In the implementation of FIG. 2B, the system 200 further includes a handheld computing device 234, which may be the computing device 104, discussed above. In the implementation of FIG. 2C, the system 200 further includes a computing board 236, which may be the computing device 104, discussed above. In each of the implementations of FIGS. 2A, 2B, and 2C, the system 200 also includes a robotic device 206, which may be the robotic device 106, discussed above. Further, in each of the implementations of FIGS. 2A, 2B, and 2C, the various devices shown and described therein may communicate with each other over a network 208, which may be the network 108, discussed above. In implementations including the handheld computing device 234 (FIG. 2B), the handheld computing device 234 may communicate over the network 208 (e.g., using one or more network communication devices within the handheld computing device 234). In implementations including the computing board 236 (FIGS. 2A and 2C), the robotic device 206 may further include a transceiver 237 to communicate (e.g., transmit and receive data, instructions, etc.) over the network 208. In various embodiments, the transceiver 237 may be implemented as a single, integrated device or as separate transmitter and receiver devices.

As shown in each of FIGS. 2A, 2B, 2C, and in some embodiments, the client device 202 includes a graphical user interface (GUI) 230 and a control module 232, which are described in more detail below with reference to FIGS. 4-8. In some embodiments, the GUI 230 may include a video interface for displaying a real-time video stream from a point of view of the robotic device 206. In various embodiments, the real-time video stream may be collected at and transmitted from the robotic device 206 over the network 208. In some cases, the GUI 230 may also be used to display sensor data collected by the robotic device 206. In some embodiments, the control module 232 may include software, hardware, firmware, or a combination thereof that is used to generate control signals for steering, throttling, and otherwise controlling the robotic device 206. Additionally, a user interface for interacting with the control module 232 may be provided via the GUI 230. In some embodiments, a user of the client device 202 may be able to select a controller type, enable an automatic drive engine, update a camera type and/or video feed source, modify steering and/or throttle, or otherwise control the robotic device 206 via a control module 232 portion of the GUI 230. In some embodiments, the control signals from control module 232 may be transmitted to the robotic device 206 over the network 208.

In some embodiments, such as shown in the implementations of FIGS. 2A and 2C, the robotic device 206 includes a computing board 236 coupled to the robotic device 206. In at least some embodiments, the computing board 236 coupled to the robotic device 206 includes a Jetson Nano board, although other implementations are possible. In the implementation of FIG. 2B, the robotic device 206 may include or be coupled to a handheld computing device 234 (e.g., such as a smartphone, tablet, game console, wearable device, in some cases). In some embodiments, the handheld computing device 234 may execute one or more applications to process and provide streaming video to a client, select between remote control and local control of the robotic device 206 and/or neural network inference, interface with other components 238, record data, etc. As shown in each of the implementations of FIGS. 2A, 2B, 2C, the robotic device 206 may also include other components 238 such as a microcontroller board (e.g., an Arduino board), frame, chassis, a motor, wheels, servo, electronic speed control (ESC) module, battery, cables/wires, 3D printed components, etc. In various examples, the robotic device 206 may further include other components such as a braking system, a suspension system, additional servo motors, a steering assembly, or other appropriate components.

In various embodiments, and as shown in the implementations of FIGS. 2A and 2C, the robotic device 206 includes, or is communicatively coupled to, a plurality of sensors such as a camera 210, a depth camera 212, a radar 214, a LiDAR 216, and/or other sensors 218. In some embodiments, the sensors 210-218 may be coupled to the robotic device 206 in various locations, including front, back, sides, top, and bottom of the robotic device 206. In the implementation of FIG. 2B, the robotic device 206 is communicatively coupled to a plurality of sensors such as a camera 210A, a depth camera 212A, a LiDAR 216A, and/or other sensors 218A, where the plurality of sensors 210A, 212A, 216A, 218A are incorporated into or are coupled to the handheld computing device 234, in some embodiments. In various implementations, there may be more than one sensor of the same type (e.g., such as multiple cameras) disposed at different locations of the robotic device 206 (e.g., such as one camera 210 in the front and another camera 210 in the back). In some cases, one or more of the sensors 210-218, as well as other components (e.g., such as the handheld computing device 234), may be attached to the robotic device 206 using 3D printed components. In some examples, the other sensors 218, 218A may include GPS, inertial sensors, other suitable sensors, or combinations thereof. Generally, the various sensors 210-218, including sensors 210A, 212A, 216A, 218A may be used to determine the location of the robotic device 206, determine speed, throttle data, direction data, etc., of the robotic device 206, determine features of the environment surrounding the robotic device 206 (e.g., including obstacles in the environment), and predict or otherwise control the steering, throttle, speed, direction, etc., of the robotic device 206. In some embodiments, the sensors 210-218, including sensors 210A, 212A, 216A, 218A may collect data in real-time and/or at predefined time intervals, such as every 200 ms. In some embodiments, the data provided by the sensors 210-218 may be communicated to the computing board 236. Alternatively, in some embodiments, the data provided by the sensors 210-218, including sensors 210A, 212A, 216A, 218A may be communicated to the client device 202 (e.g., for display of a video stream via the GUI 230, among others), over the network 208, to communicate with the computing device 204 and control the robotic device 206.

In some embodiments, and with reference to the various implementations of FIGS. 2A-2C, each of the cloud-based computing device 204 (FIG. 2A), the handheld computing device (FIG. 2B), and the computing board (FIG. 2C) include a neural network engine 222 and an automatic drive engine 220. The neural network engine 222 may include one or a plurality of neural network models 224 and an agent module 226. In various cases, the neural network models 224 may include ML models, DL models, and/or other suitable AI models. In some embodiments, the plurality of neural network models 224 may include convolutional neural networks (CNNs). By way of example, such CNNs may include PilotNet, MobileNet, Resnet50, VGG19, VGG16, Alexnet, YOLO, or other suitable CNNs. In some cases, one or more multi-layer perceptrons (MLPs) are added to a CNN, which serves as a backbone model. Additional details regarding the neural network engine 222, including training and deployment stack, are provided below with reference to FIGS. 9A, 9B, and 10-13. In various embodiments, each neural network model of the plurality of neural network models 224 may receive a subset of data from one or more of the sensors 210-218 (in FIGS. 2A, 2C), or a subset of data from one or more of the sensors 210A, 212A, 216A, 218A (in FIG. 2B), and generate an output that includes steering and/or throttle data. In some cases, the subset of data received by each neural network model of the plurality of neural network models 224 may be different from subsets of data received by the other neural network models of the plurality of neural network models 224 as each subset of data may include data from different combinations of sensors. In some embodiments, the agent module 226 may select an output of one of the neural network models of the plurality of neural network models 224 and transmit the output to the automatic drive engine 220. The automatic drive engine 220, in turn, may convert the steering and/or throttle data in the output into control data for controlling the robotic device 206. As previously noted, this process may repeat iteratively to control the driving direction and speed of the robotic device 206. Additionally, in some embodiments, each of the cloud-based computing device 204 (FIG. 2A), the handheld computing device (FIG. 2B), and the computing board (FIG. 2C) may also include or be coupled to a database 228, which may be similar to the database discussed above with reference to the computing device 104. In some embodiments, the database 228 may store data collected using the sensors 210-218, including sensors 210A, 212A, 216A, 218A. Further, in some cases, the database 228 may store steering, throttle, image, and video data, among others. The data may be stored in data structures or tuples that also include corresponding timestamps.

Figure 3:
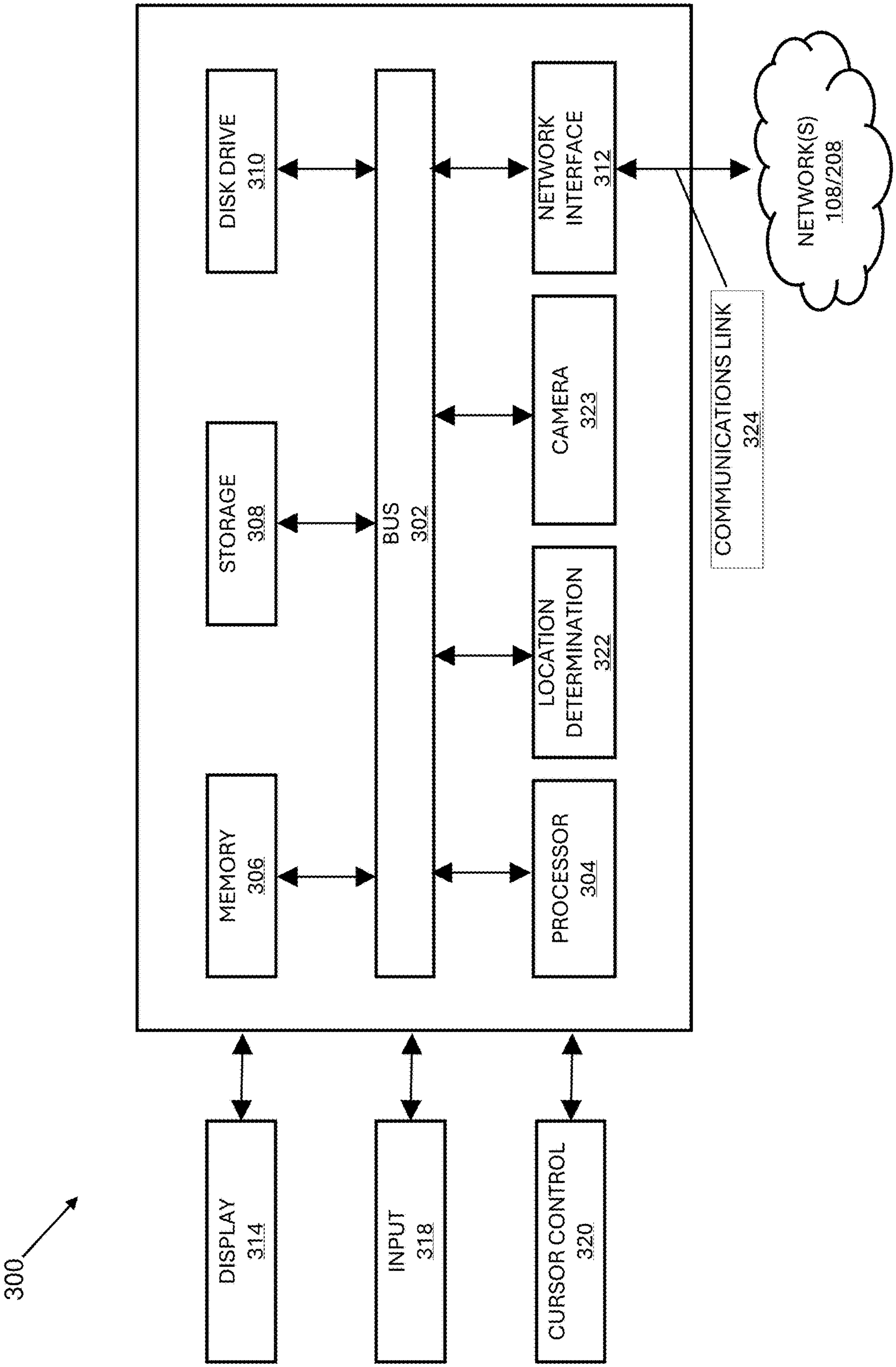
FIG. 3 is a schematic view illustrating an embodiment of a computer system suitable for implementing the systems and methods described herein.

Elaborating on aspects of at least some of the hardware components, and with reference to FIG. 3, an embodiment of a computer system 300 suitable for implementing, for example, the client devices 102, 202, the computing devices 104, 204, handheld computing device 234, computing board 236, as well as possibly other portions of the robotic devices 106, 206, is illustrated. It should be appreciated that other devices utilized by, or in communication with the systems 100, 200, may likewise be implemented as the computer system 300 in a manner as follows.

In accordance with various embodiments of the disclosure, computer system 300, such as a computer and/or a server, includes various resources, such as a bus 302 or other communication mechanism for communicating information, which interconnects subsystems and components, such as a processing component 304 (e.g., processor, micro-controller, digital signal processor (DSP), graphics processing unit (GPU), etc.), a system memory component 306 (e.g., RAM), a static storage component 308 (e.g., ROM), a disk drive component 310 (e.g., magnetic, optical, or solid-state), a network interface component 312 (e.g., modem, Ethernet card, IEEE 802.11 networking component, or a Bluetooth low-energy module), a display component 314 (e.g., CRT or LCD), an input component 318 (e.g., keyboard, keypad, or virtual keyboard), a cursor control component 320 (e.g., mouse, pointer, or trackball), a location determination component 322 (e.g., a Global Positioning System (GPS) device as illustrated, a cell tower triangulation device, and/or a variety of other location determination devices known in the art), and/or a camera component 323. In one implementation, the disk drive component 310 may comprise a database having one or more disk drive components.

In accordance with embodiments of the disclosure, the computer system 300 performs specific operations by the processing component 304 executing one or more sequences of instructions contained in the memory component 306, such as described herein with respect to the client devices, computing devices, and robotic devices. Such instructions may be read into the system memory component 306 from another computer readable medium, such as the static storage component 308 or the disk drive component 310. In other embodiments, hard-wired circuitry may be used in place of or in combination with software instructions to implement embodiments of the disclosure.

Logic may be encoded in a computer readable medium, which may refer to any medium that participates in providing instructions to the processing component 304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 310, volatile media includes dynamic memory, such as the system memory component 306, and transmission media includes coaxial cables, copper wire, and fiber optics, including wires that comprise the bus 302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 300. In various other embodiments of the disclosure, a plurality of the computer systems 300 coupled by a communication link 324 to the network 108/208 (e.g., such as a LAN, WLAN, PTSN, and/or various other wired or wireless networks, including telecommunications, mobile, and cellular phone networks) may perform instruction sequences to practice embodiments of the disclosure in coordination with one another.

The computer system 300 may transmit and receive messages, data, information and instructions, including one or more programs (i.e., application code) through the communication link 324 and the network interface component 312. The network interface component 312 may include an antenna, either separate or integrated, to enable transmission and reception via the communication link 324. Received program code may be executed by processing component 304 as received and/or stored in disk drive component 310 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Referring now to FIGS. 4-8, illustrated therein are exemplary embodiments of a client application interface displayed via a GUI 400, which may be the GUI 230 of the client device 202, discussed above. As described in more detail below, the client application interface provides an interface for controlling a robotic device, such as the robotic devices 106, 206, discussed above. More generally, the client application interface serves as the endpoint for all communication from, or serves as a hub for all communication from, the robotic devices. For instance, the client application interface may serve as the endpoint for all communication from one or more applications executing on handheld computing devices (e.g., such as handheld computing device 234) and/or computing boards (e.g., such as computing board 236) of respective robotic devices (e.g., such as robotic device 206). In some embodiments, the client application interface provides for hot swapping features of the system (e.g., such as the systems 100, 200), modifying settings, or perform other actions to affect the system and/or a user experience. "Hot swapping", as used herein, refers to the replacement or addition of system components (e.g., including modifying settings or performing actions that will affect the system and/or the user experience), without stopping, shutting down, or rebooting the system (e.g., while the system continues to run). It is also noted that, in various embodiments, the client application interface may simultaneously support a plurality of operating systems and run-time environments such as Android OS (e.g., such as when the handheld computing device 234 includes an Android handheld computing device), Apple iOS (e.g., such as when the handheld computing device 234 includes an Apple handheld computing device), and a Jetson run-time environment (e.g., such as when the computing board 236 include a NVIDIA® Jetson® computing board). As previously noted, in some cases, the robotic device 206 may include a microcontroller board (e.g., such as an Arduino Board), as part of the other components 238, discussed above. In some embodiments, the microcontroller board may be paired with the handheld device 234 or with the computing board 236 (e.g., such as via a Bluetooth connection) for communication therewith. Although not limited thereto, in at least some cases, the client application interface as shown and described with reference to FIGS. 4-8 may be created using Python (e.g., PySide6 and Qt for Python).

Figure 4:
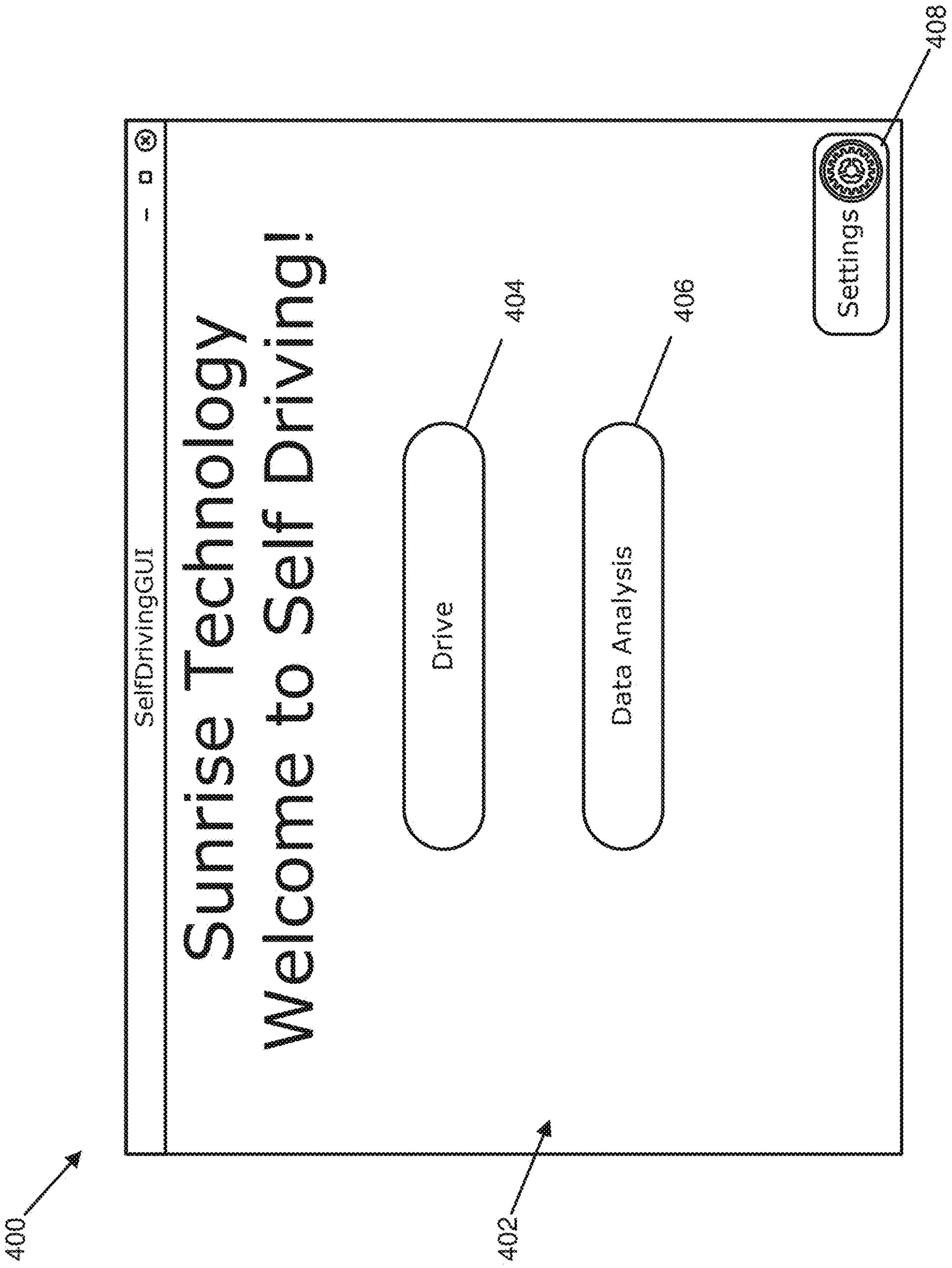
FIGS. 4, 5, 6, 7, and 8 illustrate a client application interface displayed via a graphical user interface (GUI) of a client device, in accordance with some embodiments.
Figure 5:
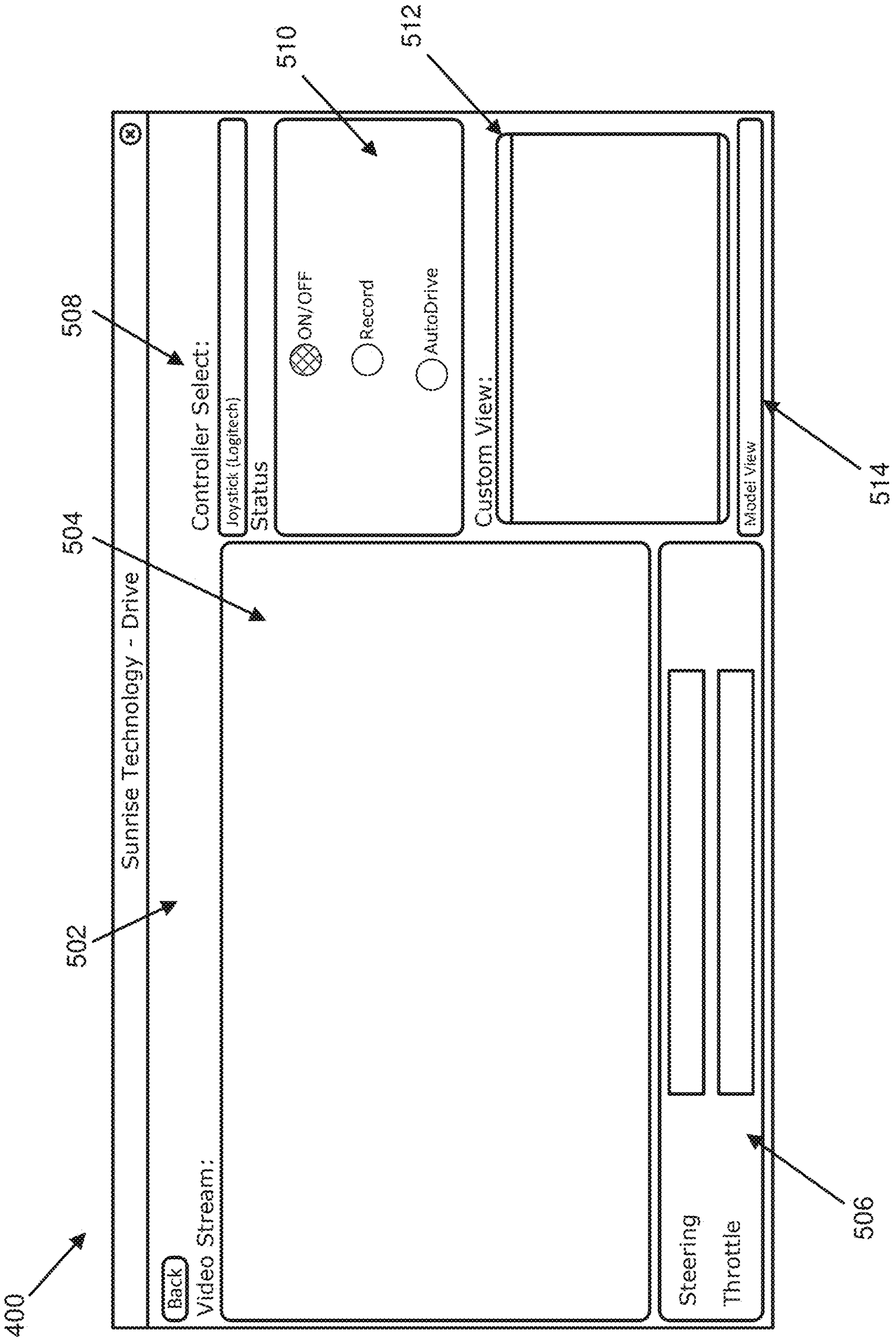

As shown in the example of FIG. 4, and upon launching the client application at the client device 202, the client application interface may initially display a window 402 via the GUI 400. In some embodiments, the window 402 may include a drive button 404, a data analysis button 406, and a settings button 408. With reference to FIGS. 4 and 5, responsive to selecting the drive button 404, the client application interface may display a drive window 502 via the GUI 400. In some embodiments, the drive window 502 includes a camera feed portion 504 that may be used to display a video stream (and/or images) provided by the robotic device 206 (e.g., such as by the handheld device 234 and/or the computing board 236) as robotic device 206 moves in the environment or stands in place. The video stream and/or images provided in the camera feed portion 504 may be captured by one or more of the cameras of the robotic device 206. The drive window 502 may further include steering and throttle indicators 506 that may be representative of steering and throttle values input by a user or automatically determined (e.g., such as via the computing device 204 including the neural network engine 222).

Figure 6:
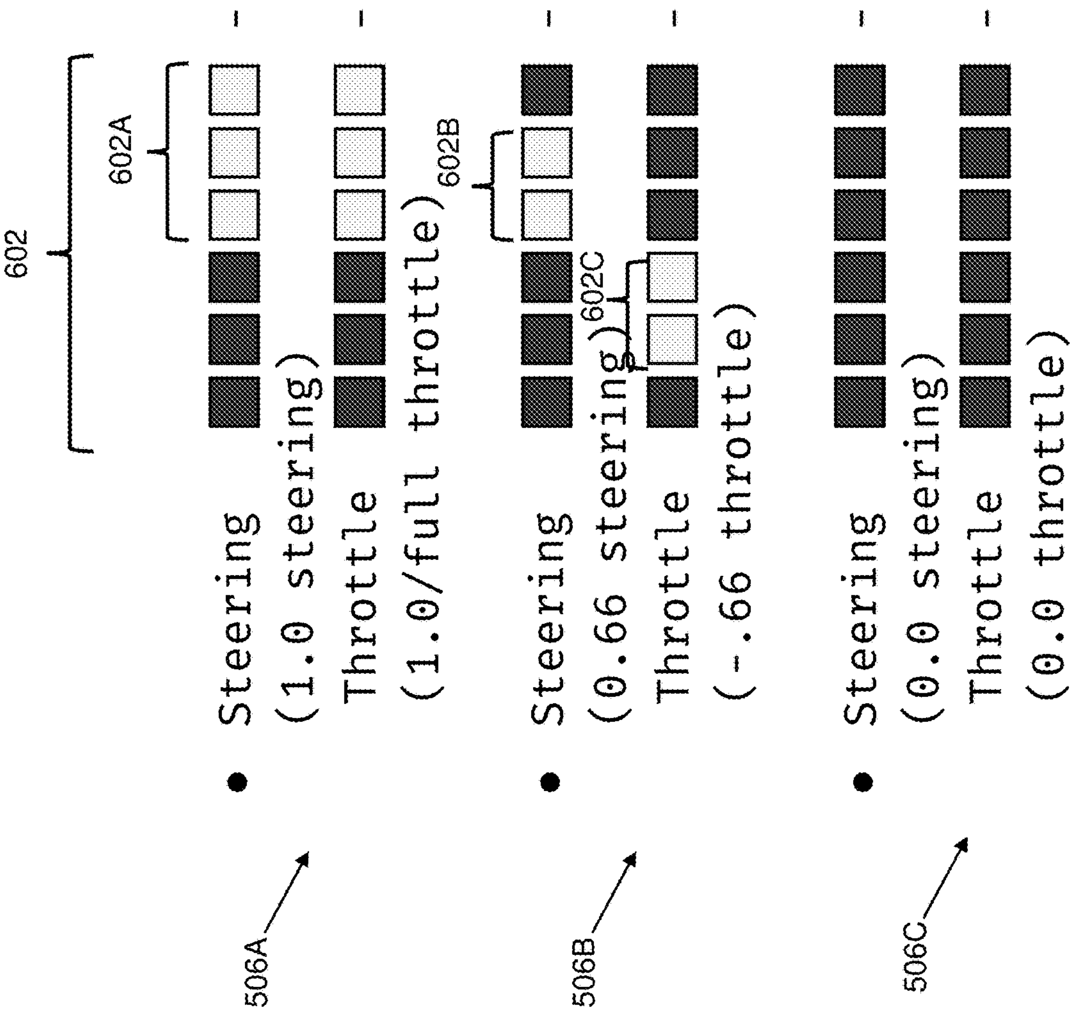

For purposes of illustration, FIG. 6 provides examples of active throttle indicators 506A, 506B, 506C showing different values for steering and throttle. For each of the steering and throttle indicators, an array of white/black indicators 602 is provided to illustrate a current value for the steering and throttle. Although six white/black indicators 602 are shown, there may be any number of steering and throttle indicators. In an example, the white indicators of the array of white/black indicators 602 are used to indicate a relative steering direction and a throttle value. It is also noted that, in some embodiments, the array of while/black indicators 602 may correspond to numerical steering and throttle values, which may be in a range of between −1.0 to +1.0. These values may be subsequently linearly mapped to a value between 0 and 255 prior to sending the values to the computing board 236 for steering and throttle control of the robotic device 206. In the exemplary throttle indicator 506A, a rightmost set 602A of the white/black indicators 602 is white for each of the steering and throttle values, indicating a steering value of +1.0 (full right turn) and a throttle value of +1.0 (full throttle). In the exemplary throttle indicator 506B, a right-shifted set 602B of the white/black indicators 602 is white for the steering value, indicating a steering value of +0.66 (partial right turn). Further, in the exemplary throttle indicator 506B, a left-shifted set 602C of the white/black indicators 602 is white for the throttle value, indicating a throttle value of −0.66 (partial throttle in reverse). In the exemplary throttle indicator 506C, none of the white/black indicators 602 is white (all indicators are black) for each of the steering and throttle values, indicating a steering value of 0.0 (full left turn) and a throttle value of 0.0 (full throttle in reverse). While some examples of throttle indicators 506 for various steering and throttle values have been given, it will be understood that the illustrated examples are merely exemplary and not meant to be limiting in any way.

Returning to FIG. 5, the drive window 502 may further include a controller select drop-down menu 508 that may be used to select a particular controller type from a set of all available controller types. In some embodiments, when a particular controller is selected, the previously selected controller is released and the newly selected controller is activated for use. While any of a plurality of controller types may be used, in some cases, the controllers selectable via the drop-down menu 508 may include a Logitech Steering Wheel, a Logitech Gamepad, a Playstation Gamepad, a joystick, or other suitable controller type. Regardless of the particular controller selected, it is noted that the selected controller is what is used to drive, or otherwise control, the robotic device 206 when using the client application interface displayed via a GUI 400. It is further noted that control of the robotic device 206 using the client application interface displayed via a GUI 400, and thus using one of the controllers selected via the drop-down menu 508, may be referred to as remote control of the robotic device 206. In some embodiments, during remote control of the robotic device 206 using a selected controller, user inputs provided by the controller may be communicated to the handheld computing device 234, which may be in communication with a computing board 236, which in turn provides control signals to the robotic device 206. As previously noted, the robotic device 206 may be operated under remote control or local control, and selection between remote control and local control may be performed via an application executing on the handheld computing device 234. In some embodiments, when using local control, the handheld computing device 234 may be connected to a local controller (e.g., such as a gamepad or joystick), for example using a Bluetooth connection, to thereby control the robotic device 206 locally (e.g., in an area proximate to the robotic device 206) and apart from the client application interface displayed via a GUI 400.

In some embodiments, the drive window 502 may further include a status window 510 that includes radio buttons, toggle button, or other graphical control elements, to indicate a status of, and in some embodiment to provide selection of, various features and/or functions of the system 200. In the present example, the status window 510 provides radio buttons to indicate an ON/OFF state of the system and/or to turn the system ON or OFF, to indicate a status of a record feature and/or to activate or deactivate the record feature, and to indicate a status of an autodrive feature and/or to activate or deactivate the autodrive feature. In some embodiments, when the record feature is active, the client application may save (e.g., at the client device 202, at the robotic device 206, at the computing device 204, at the handheld computing device 234, at the computing board 236, or a combination thereof) data collected by the sensors 210-218 (including sensors 210A, 212A, 216A, 218A) and/or data generated by user inputs or the neural network engine 222/automatic drive engine 220 (e.g., such as image data, throttle data, steering data, controller data, radar data, LiDAR data, and/or other data). In some embodiments, when the autodrive feature is active, the robotic device 206 may be controlled using the computing device, including the neural network engine 222 and the automatic drive engine 220, as previously described. Additional details regarding the autodrive feature are provided below with reference to FIGS. 15A, 15B, 15C.

The drive window 502 may also include a custom view window 512. In some embodiments, the custom view window 512 may display a cropped view of frames/images that are to be subsequently normalized and provided as inputs to a model (e.g., such as a neural network model) which generates an output that includes steering and/or throttle data. Alternatively, in some cases, the custom view window 512 may display an image captured by the depth camera 212. The desired display of the custom view window 512 may be selectable using a drop-down menu 514, as shown.

As noted above, the client application interface may be created using Python (e.g., PySide6 and Qt for Python). As such, in some embodiments, the drive window 502 may use multiple Python threads (e.g., two threads) for control. For example, one of the threads is for updating the camera (e.g., including the camera feed portion 504) and one for the controller (e.g., selectable via the drop-down menu 508). Both of these threads work independently of each other and provide for concurrent execution. In some examples, a Python object is also used to instantiate a handler, controller, and camera, all of which are used conjointly to provide the user with the necessary capabilities to drive the robotic device 206 remotely. In some embodiments, the handler can be used to handle both the controllers (e.g., selectable via the drop-down menu 508) and the robotic devices 206 regardless of particular configuration (e.g., type of handheld computing device 234 or computing board 236). Thus, as one example, regardless of a particular platform (e.g., such as iOS, Android, Jetson run-time) that a user selects, all of the controllers available via the drop-down menu 508 will work seamlessly with the selected platform. As a result, it may not be necessary to write custom code for each controller, adding new controllers or new platforms is fairly simple, and the system can be more easily maintained.

Figure 7:
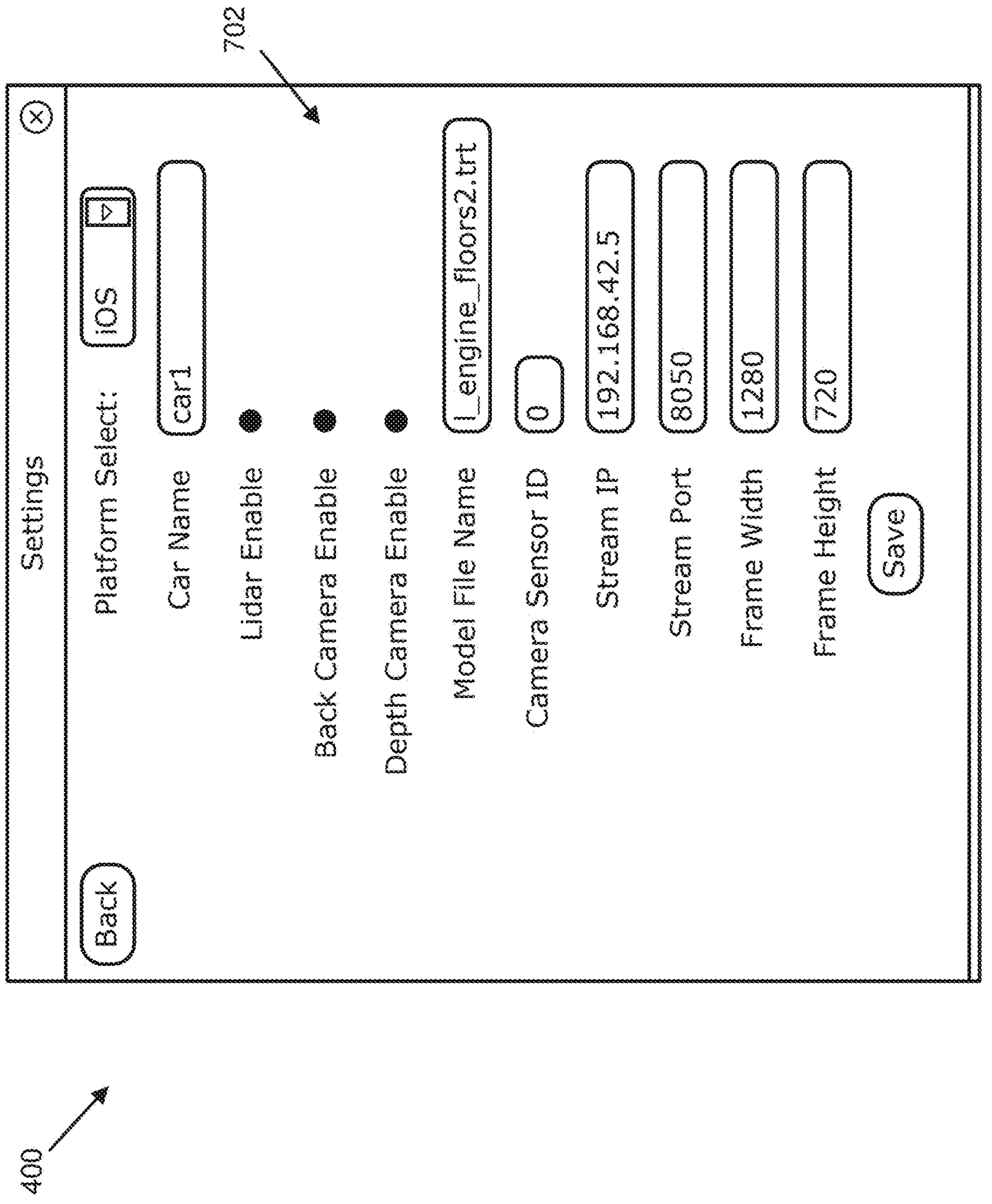

With reference to FIGS. 4 and 7, responsive to selecting the settings button 408, the client application interface may display a settings window 702 via the GUI 400. In some embodiments, the settings window 702 provides a user interface that allows a user to modify settings of a configuration file (e.g., such as in a configuration file used to execute the PySide6 application) without having to manually edit source code of the configuration file. In some embodiments, the settings available for modification via the settings window 702 include a platform (e.g., such as iOS, Android, Jetson run-time), a car name (or name of the robotic device 206), sensor enable/disable, such as LiDAR enable/disable, camera enable/disable, depth camera enable/disable, model file name (e.g., neural network model file name), camera sensor ID, video stream IP, video stream port, frame width, and frame height. While some examples of settings that may be modified via the settings window 702 have been given, it will be understood that other settings may alternatively or additionally be modified via the settings window 702, without departing from the scope of the present disclosure.

Figure 8:
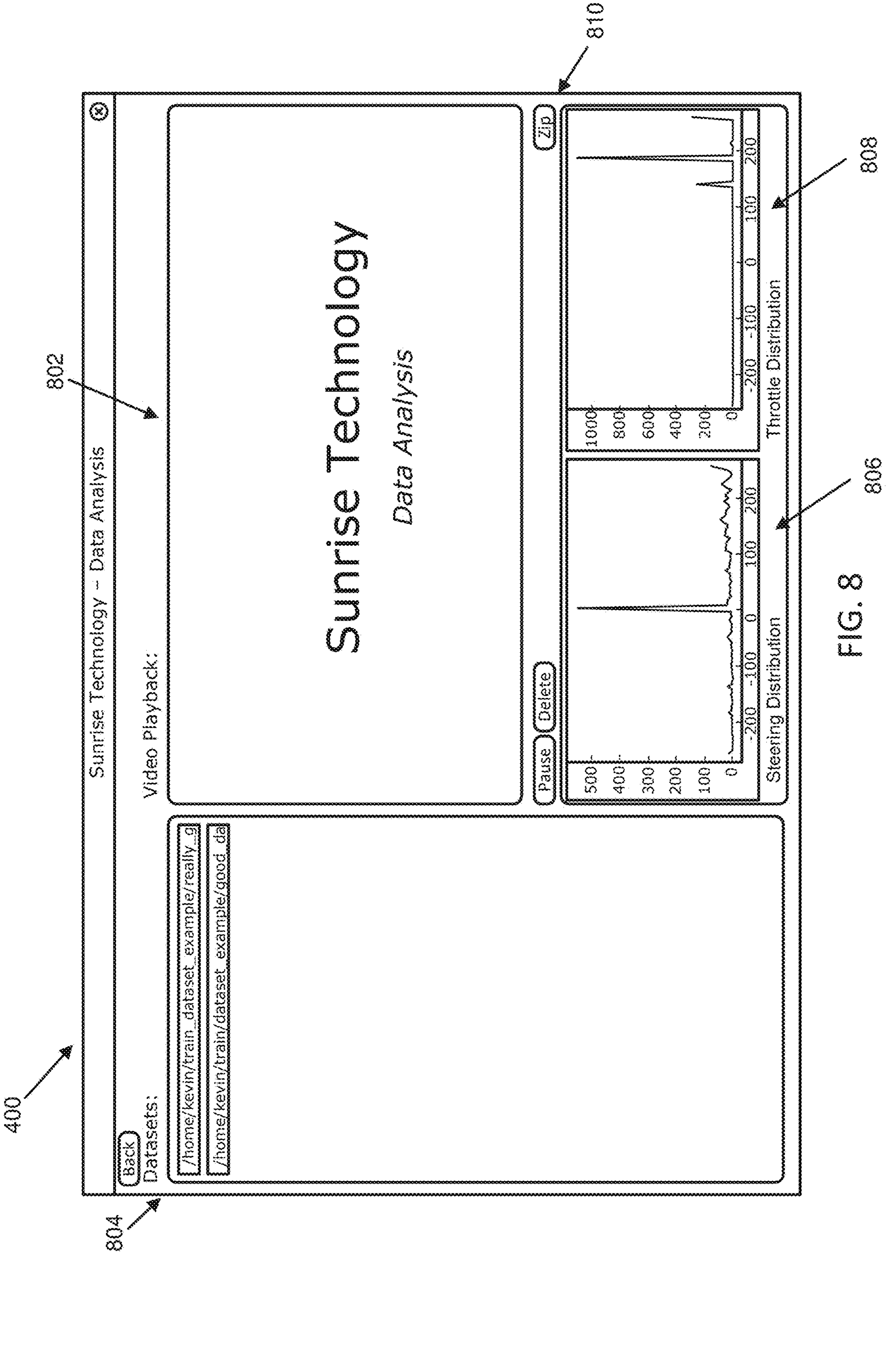

With reference to FIGS. 4 and 8, responsive to selecting the data analysis button 406, the client application interface may display a data window 802 via the GUI 400. In some embodiments, the data window 802 displays a list of datasets 804 that have been stored (e.g., in connection with training and/or operating the robotic device 206). In some cases, the datasets 804 can be played through, paused, and selectively deleted. In some embodiments, the data window 802 may also include a steering distribution window 806 and a throttle distribution window 808. The steering and throttle distributions 806, 808 may provide some insight (e.g., such as frequency of occurrence of steering and throttle related inputs) into the contents of each of the datasets of the list of datasets 804. In an example, the data window 802 may also provide a zip file button 810 that provides for zipping all the files (of the datasets 804), for example, to allow users to clean and package their data for distribution (e.g., such as for use in remote/cloud-based training).

Turning to the use of neural networks to control the robotic device 206, and as noted above, the handheld computing device 234 may execute one or more applications to provide for neural network inference and training, among others. In some embodiments, when an Android OS platform is used (e.g., such as when the handheld computing device 234 includes an Android handheld computing device), the handheld computing device 234 may utilize a first machine learning platform including a Tensorflow/Pytorch application for training an inference of the neural network models 224. In some embodiments, when an Apple iOS platform or a Jetson run-time environment is used (e.g., such as when the handheld computing device 234 includes an Apple handheld computing device or when the computing board 236 includes a NVIDIA® Jetson® computing board), the handheld computing device 234 and/or the computing board 236 may utilize a second machine learning platform including a Pytorch application for training an inference of the neural network models 224. It will be understood that in other embodiments, different machine learning platforms may be used without departing from the scope of the present disclosure.

With respect to the neural network training and deployment stack, and in various embodiments, different strategies may be used to enhance the output of the neural network models (e.g., such as the neural network models 224). For instance, in some cases, neural network engine may be trained on a training dataset that includes images and/or sensor data collected using sensors 210-218 or sensors 210A, 212A, 216A, 218A. In some embodiments, training may be performed using a remote device (e.g., such as the cloud-based computing device 204), and the trained model (s) may be downloaded to a handheld computing device 234 or a computing board 236 for local execution. In some cases, data augmentation may be used to increase and/or supplement data in a training set for a neural network model, to increase its robustness and performance, and cover various test cases that are not included in the original training dataset. Data augmentation may be used in behavior cloning and may be applied to various image types. Data augmentation may generate new training images by applying various transformations to an original set of images. By way of example, such transformations may include geometric transformations such as translation, cropping, flipping, and rotation, random erasing, and photometric transformations (e.g., such as lighting and color), among others. It is also noted that before being used to train a neural network model, the input data (e.g., which may include frames/images, for instance) should also be normalized to provide faster model convergence, prevent gradient issues, and improve model performance.

Figure 9A:
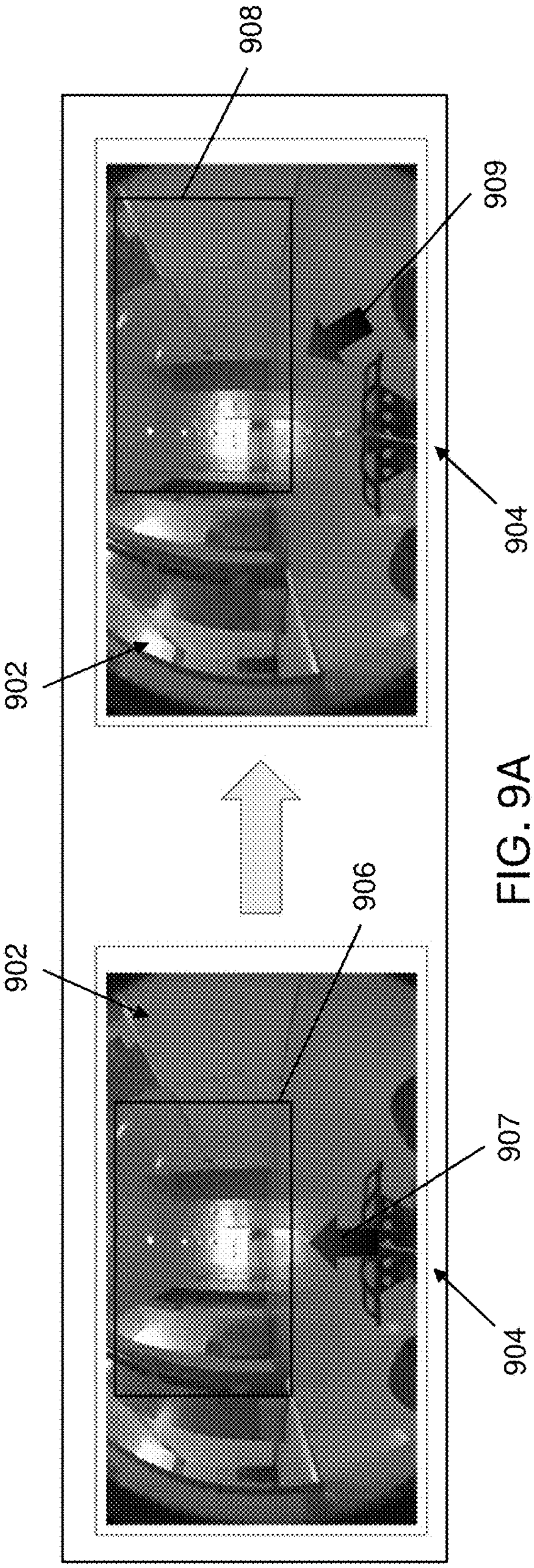
FIGS. 9A, 9B, 10, 11, and 12 illustrate examples of data augmentation transformations for training neural network models, in accordance with some embodiments.
Figure 9B:
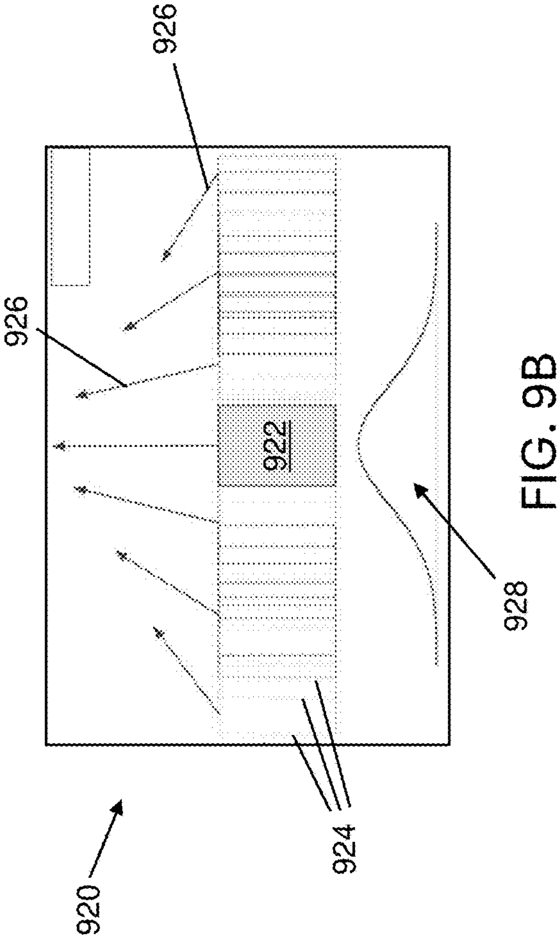

Referring to FIGS. 9A and 9B, examples of data augmentation by translation/cropping are provided. Translation, in various implementations, is a particularly valuable technique to enhance robustness of a neural network model. In the lefthand side of FIG. 9A, provided therein is an image 902, which may be an image captured by a forward-facing camera of the robotic device 206. A portion 904 of the robotic device 206 is visible at the bottom of the image. In the righthand side of FIG. 9A, provided therein is the image 902, with the portion 904 of the robotic device 206 visible at the bottom of the image. In the lefthand side of FIG. 9A, the image 902 may be cropped, as indicated by box 906 which represents the cropped image. Based on the cropped image 906, a steering angle is indicated by arrow 907 (steering angle of 0.0, in this example). In the righthand side of FIG. 9A, the image 902 may be cropped, as indicated by box 908 which represents the cropped image. Based on the cropped image 908, a steering angle may be adjusted and is indicated by arrow 909 (steering angle of −0.5, in this example). Thus, different portions of the image 902 are cropped in each of the lefthand and righthand sides of FIG. 9A, resulting in different steering angles of the robotic device 206. In various examples, by shifting the cropped image around (e.g., cropped image 906 vs. cropped image 908) while also shifting the steering angle of the robotic device 206, it is possible to simulate the robotic device 206 being in different positions. It is noted that, in various examples and regardless of the simulated position of the robotic device 206, the steering angle (represented by arrows 907, 909) will point back to the original position of the robotic device 206. FIG. 9B provides a generalized diagram 920 that illustrates the technique described above with reference to FIG. 9A. In particular, FIG. 9B illustrates an original position 922 of the robotic device 206, a plurality of dotted box shapes 924 representing simulated positions of the robotic device 206, arrows 926 indicating steering angles for different ones of the simulated positions (dotted box shapes 924) of the robotic device 206, and a steering target distribution 928. As shown, the steering target distribution 928 confirms that regardless of the simulated position of the robotic device 206, the steering angle (represented by arrows 926) will point back to the original position 922 of the robotic device 206.

Figure 10:
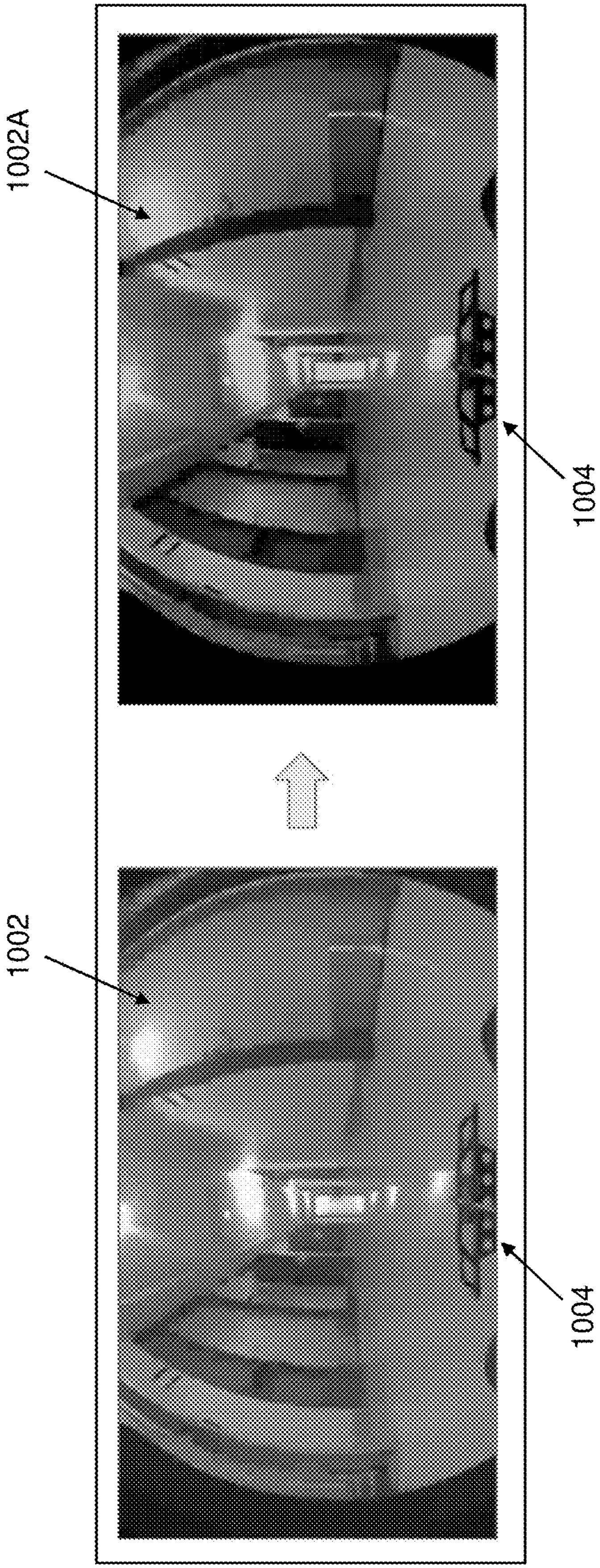

Referring to FIG. 10, examples of data augmentation by modifying the lighting conditions are provided. In the lefthand side of FIG. 10, provided therein is an image 1002, which may be an image captured by a forward-facing camera of the robotic device 206. A portion 1004 of the robotic device 206 is visible at the bottom of the image. In the righthand side of FIG. 10, provided therein is an image 1002A, which may be the image 1002 with a modified lighting condition, and with the portion 1004 of the robotic device 206 visible at the bottom of the image. As shown, the image 1002 shown in the lefthand side of FIG. 10 has different lighting conditions as compared to the image 1002A shown in the righthand side of FIG. 10. In various embodiments, the different lighting conditions may include differences in saturation, brightness, and/or contrast of the images 1002, 1002A. By applying data augmentation by modifying lighting conditions, the neural network model may be enhanced and more robust, for instance, in situations where the lighting in actual, real-world data is not consistent with the training data set.

Figure 11:
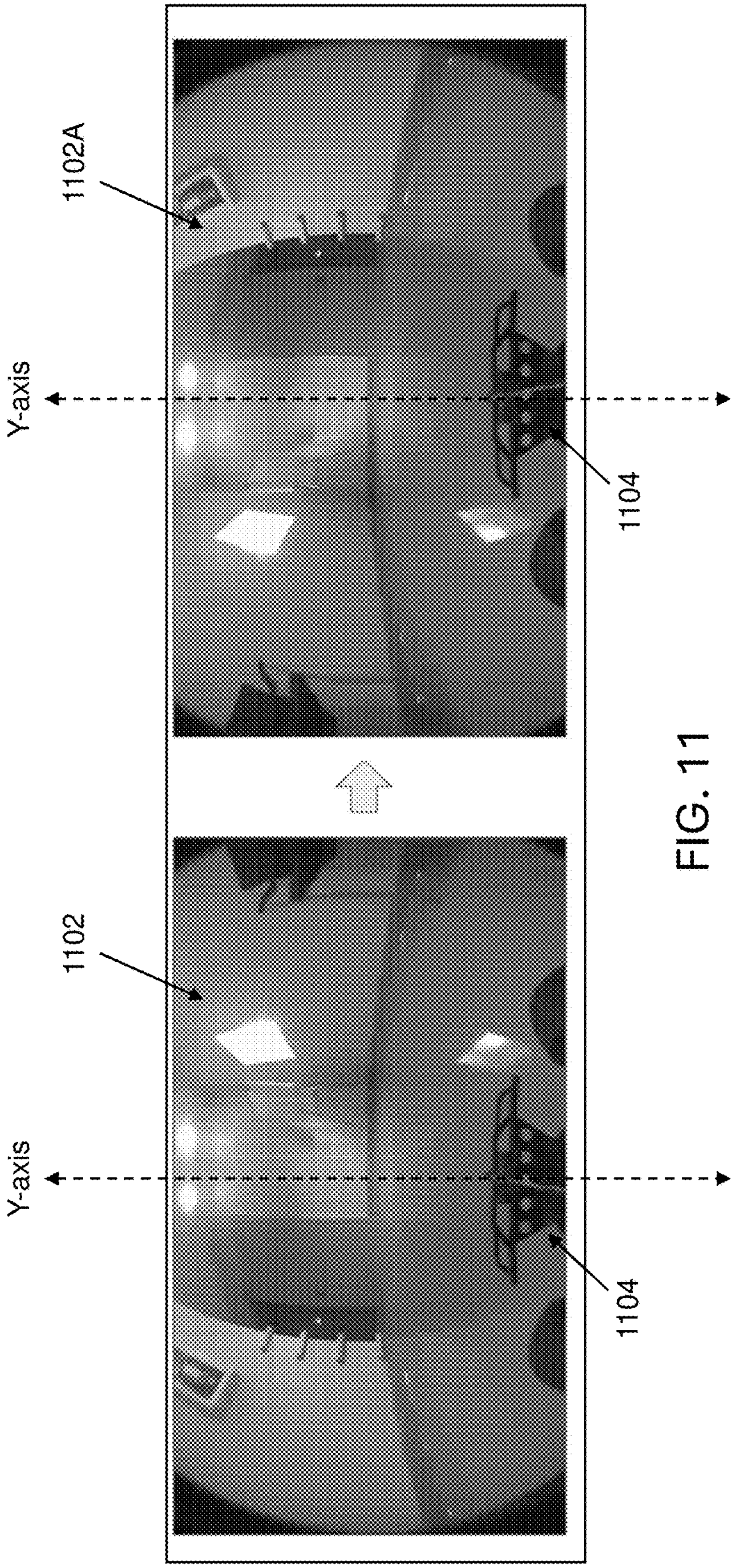

Referring to FIG. 11, examples of data augmentation by flipping the image and steering are provided. In the lefthand side of FIG. 11, provided therein is an image 1102, which may be an image captured by a forward-facing camera of the robotic device 206. A portion 1104 of the robotic device 206 is visible at the bottom of the image. In the righthand side of FIG. 11, provided therein is an image 1102A, which may be the image 1102 that has been flipped about a Y-axis (as shown), and with the portion 1104 of the robotic device 206 visible at the bottom of the image. It is noted that any steering angles (e.g., see FIGS. 9A/9B) associated with the image 1102 will also be flipped about the Y-axis to match the flipped image 1102A. Thus, left and right directions can be equally trained, further reducing any potential bias in the neural network model. In various implementations, this particular augmentation (e.g., flipping the image and steering) may only be applicable in certain scenarios and must be applied with caution. For example, if there is substantially no difference between the original image and the flipped image, then the neural network model may perform erratically when confronted with such a situation in the real world. However, in cases where the difference between the original image and the flipped image is clear (e.g., such as in the example of FIG. 11), then the neural network model will become much more robust.

Figure 12:
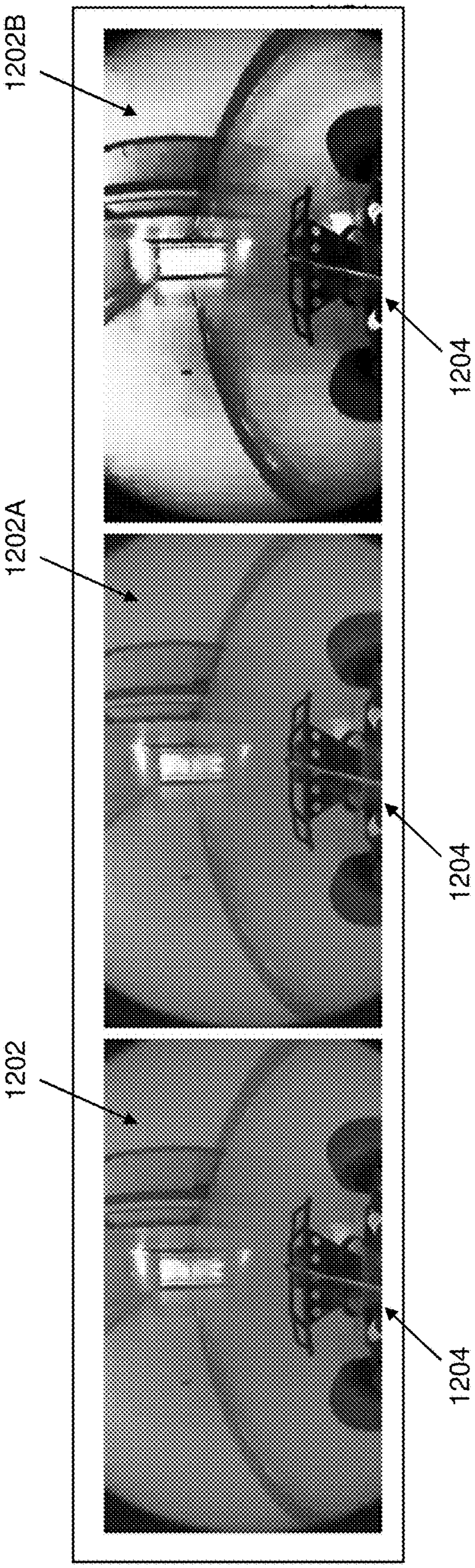

Referring to FIG. 12, examples of data augmentation by modifying the color conditions are provided. In the leftmost side of FIG. 12, provided therein is an image 1202, which may be an image captured by a forward-facing camera of the robotic device 206. A portion 1204 of the robotic device 206 is visible at the bottom of the image. In the middle of FIG. 12, provided therein is an image 1202A, which may be the image 1202 with a modified color condition, and with the portion 1204 of the robotic device 206 visible at the bottom of the image. In the rightmost side of FIG. 12, provided therein is an image 1202B, which may be the image 1002 with a further modified color condition, and with the portion 1204 of the robotic device 206 visible at the bottom of the image. In some embodiments, the image 1202 may include an RGB image, the image 1202A may include an image with a first grayscale level, and the image 1202B may include an image with a second grayscale level greater than the first grayscale level. In various implementations, the RGB image (image 1202) may be converted to a grayscale image (images 1202A, 1202B) and the image histograms may be equalized. By applying data augmentation by modifying color conditions, the neural network model may be enhanced by reducing computation cost associated with the channels of the image and/or for reducing the neural network model's dependency on recognizing certain colors (or prevent the neural network model from learning too much from color queues). Notably, the embodiments are not limited to RGB images, as other color models may also be used. Some example color models may be CMYK (Cyan, Magenta, Yellow, Key/Black), HSV (Hue, Saturation, Value), HSL (Hue, Saturation, Lightness), LAB (CIELAB), HWB (Hue, Whiteness, Blackness), RYB (Red, Yellow, Blue), and the like.

Figure 13A:
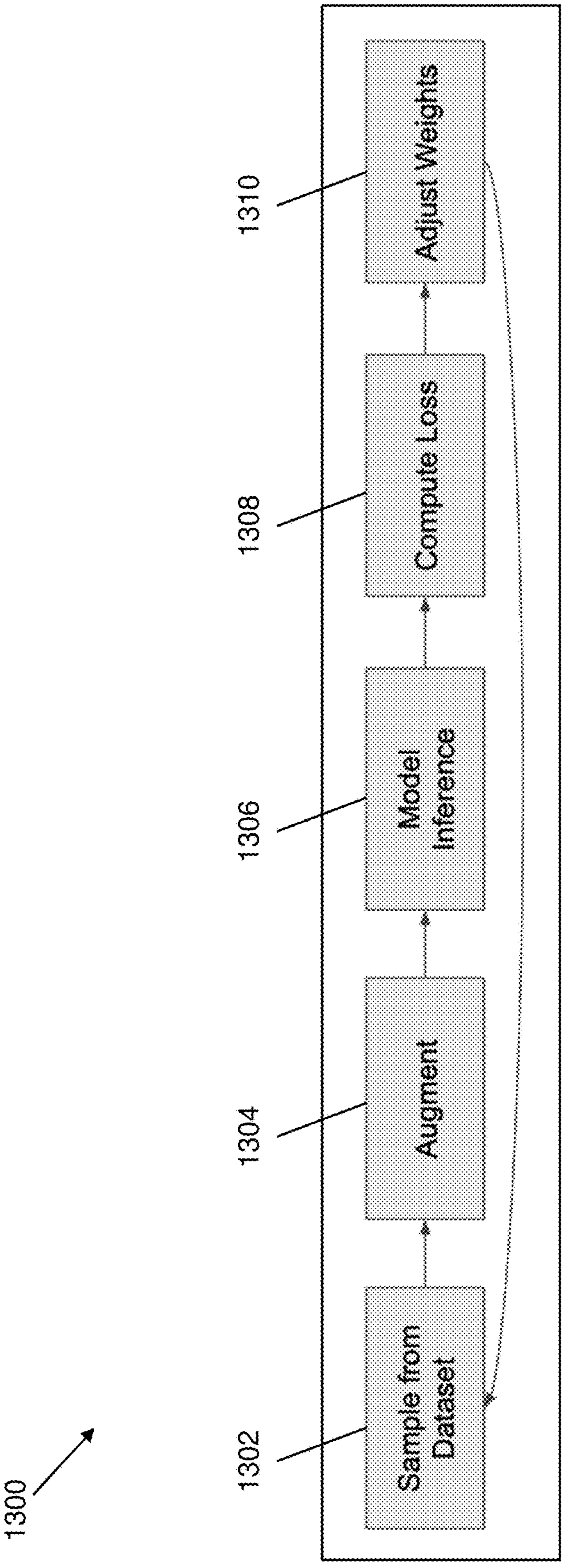
FIG. 13A illustrates an exemplary process flow for training a neural network model, in accordance with some embodiments.

As previously discussed, the neural network models used in the disclosed embodiments may include a backbone model composed of various CNNs such as PilotNet, MobileNet, Resnet50, VGG19, VGG16, Alexnet, YOLO, or other suitable CNNs. In some cases, one or more multi-layer perceptrons (MLPs) are added to the backbone model. In some embodiments, transfer learning (applying a pre-trained model to another related task) is used to initialize the model. By way of example, transferred weights may come from a model pre-trained using an image database for training (e.g., such as ImageNet). If transfer learning is used, there are several ways to implement the transfer learning such as: (i) fixing the backbone model and training only the MLPs; (ii) training the whole model together (copy weights only); or (iii) fix the first several layers of the backbone model only. FIG. 13A illustrates an exemplary process flow 1300 for training a neural network model, in accordance with some embodiments. Initially, as part of the training process, a batch of datapoint tuples (image, steering, throttle) is randomly sampled from a dataset (block 1302). Thereafter, data augmentation may be performed on the dataset, using one or more of the methods previously described (block 1304). In some embodiments, the data may also be cropped and normalized, as discussed above. In some embodiments, model inference is then performed (block 1306), for example using a single image to perform the inference. As a result of the inference, predicted values of steering and throttle are produced. The predicted values of steering and throttle are then compared to the true values of steering and throttle to compute loss (block 1308), for example, such as by using a mean squared error (MSE) function as the loss function. Thereafter, weights may be adjusted (1310), such as by using the Adam Optimization Algorithm, prior to returning to randomly sampling a batch of datapoint tuples from the dataset (block 1302).

Figure 13B:
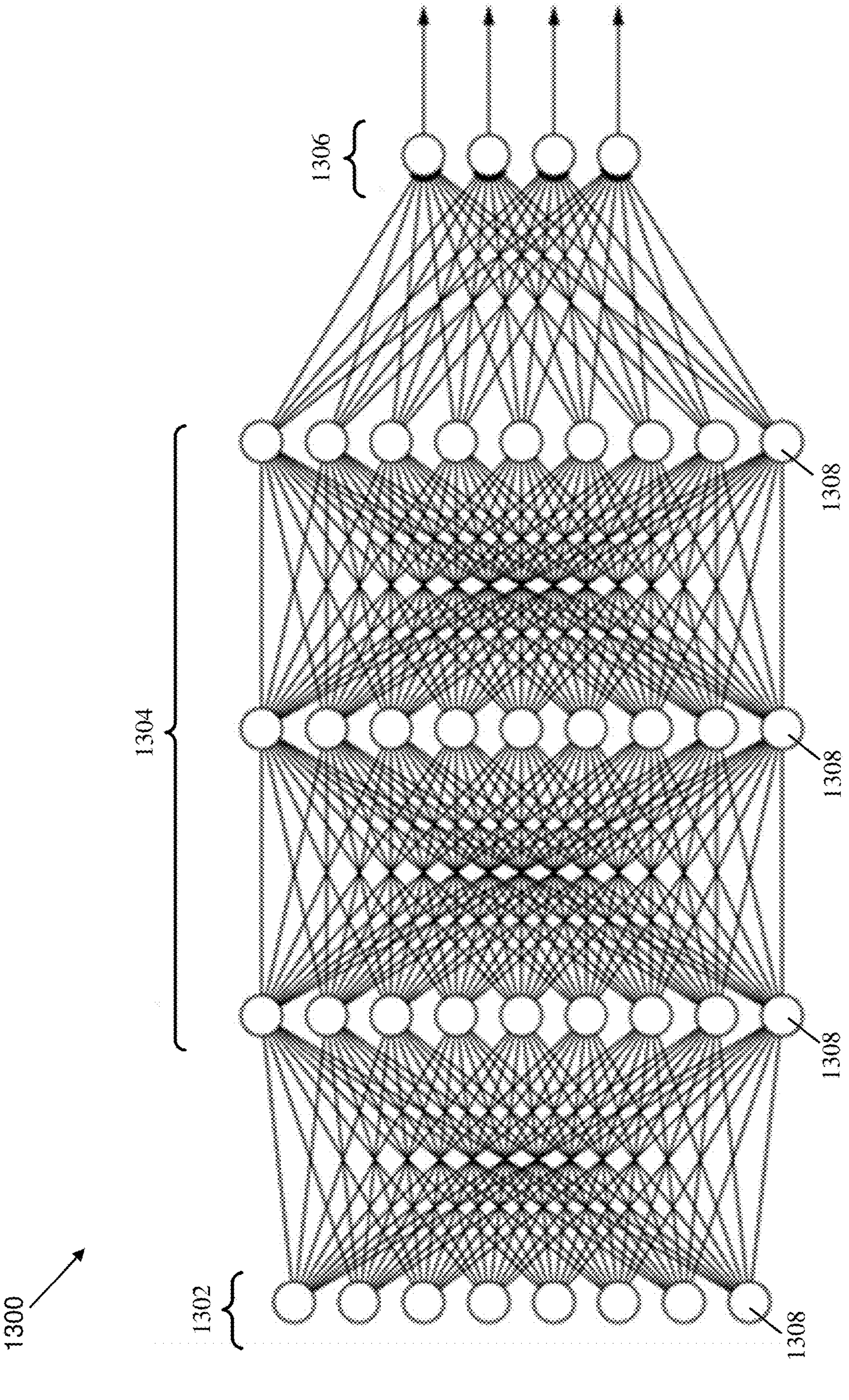
FIG. 13B provides a simplified diagram illustrating a neural network structure that may be implemented by one or more components in a neural network model, according to some embodiments.

Expanding on the neural network models that may be implemented in various embodiments of the present disclosure, FIG. 13B provides a simplified diagram 1300 illustrating the neural network structure that may be implemented by one or more components in a neural network model (e.g., such as the neural network models 224), according to some embodiments. The neural network models 224 have been previously described herein as including various CNNs. However, more generally, the neural network models disclosed herein may include a variety of different types of neural networks such as a perception neural network, a feed forward neural network, a multilayer perceptron network, recurrent neural network (RNN), generative adversarial neural network (GAN), a radial basis functional neural network, an LSTM (Long Short-Term Memory) network and the like.

The neural network models 224 may comprise a neural network architecture. The example neural network architecture may comprise an input layer 1302, one or more hidden layers 1304 and an output layer 1306. The neural network model models 224 may be built as a collection of connected units or nodes, referred to as neurons 1308. Each layer 1302, 1304, or 1306 may comprise the same or different number of neurons or nodes 1308, with neurons between layers being interconnected according to a specific topology. Each neuron 1308 may be associated with an adjustable weight. The neurons 1308 may be aggregated into layers 1302, 1304, 1306 such that different layers may perform different transformations on the respective input to generate a transformed output, which is an input for the subsequent layer. Further, different layers in a neural network model may be combined into their own neural network models, such that an output layer of one neural network model, is an input into the next neural network model, until a final output layer 1306 is reached.

Input layer 1302 receives input data, such as a subset of data from one or more of the sensors 210-218 or sensors 210A, 212A, 216A, 218A, including structured, numerical data, and/or images. The number of nodes (neurons) in the input layer 1302 may be determined by the dimensionality of the input data (e.g., the length of a vector of a given example of the input). Each node 1308 in the input layer 1302 may represent a feature or attribute of the input.

The hidden layers 1304 are intermediate layers located between the input and output layers 1302, 1306 of the neural network models 224. Although three hidden layers 1304 are shown, there may be any number of hidden layers in the neural network models 224. Hidden layers 1304 may extract and transform the input data through a series of weighted computations and activation functions associated with individual neurons.

For example, the neural network models 224 may receive input (e.g., such as a subset of data from one or more of the sensors 210-218, including sensors 210A, 212A, 216A, 218A) at input layer 1302 and generate a classifier that is an output of output layer 1306. To perform the transformation, each neuron 1308 receives input signals (which may be the input to a neural network model or the output of the preceding layer), performs a weighted sum of the inputs according to weights assigned to each connection and then applies an activation function associated with the respective neuron 1308 to the result. The output of the neuron is passed to the next layer of neurons or serves as the final output of the network. The activation function may be the same or different across different layers 1302, 1304, 1306, and may be different at neurons 1308 within each layer. Example activation functions include but not limited to Sigmoid, hyperbolic tangent, Rectified Linear Unit (ReLU), Leaky ReLU, Softmax, and/or the like. In this way, input data received at the input layer 1302 is transformed by hidden layers 1304 into different values indicative of data characteristics corresponding to a task that the neural network model has been trained to perform.

The output layer 1306 is the final layer of the neural network structure. It produces the network's output or prediction based on the computations performed in the preceding layers (e.g., 1302, 1304). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class. In the embodiments discussed herein, an output of output layer 1306 may comprise steering data and/or throttle data for controlling a robotic device (e.g., such as the robotic device 206).

The above neural network structure of neural network models 224, including the structure and number of hidden layers 1308 may be adjusted to improve accuracy, speed, and throughput off neural network models 224. For example, one of neural network models 224 may have fewer hidden layers 1308, take up less memory space, be less accurate, and may have faster processing speed, and may be suitable for hand-held computing device 234 discussed in FIG. 2B. In another example, another one of neural network models 224 may have more hidden layers 1308, take up more memory space, be more accurate, and have slower processing power, and may be more suitable to be implemented on computing device 204 discussed in FIG. 2A or computing board 236 discussed in FIG. 2C.

Neural network models 224 may also be implemented by hardware, software and/or a combination thereof. For example, the neural network models 224 may comprise a specific neural network structure implemented and run on various hardware platforms, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware may be used to implement the neural network structure is specifically configured based on factors such as the complexity of the neural network, the scale of the tasks (e.g., training time, input data scale, size of training dataset, etc.), and the desired performance.

The neural network models 224 may be trained by iteratively updating the underlying weights of the neurons 1308, etc., bias parameters and/or coefficients in the activation functions associated with neurons 1308. The weights may be updated based on a loss function, such as a mean squared estimation error (MSEE), cross-entropy loss, log-loss, and the like. For example, during training, the training data such historical signals are fed into neural network models 224 over thousands of iterations. The training data flows through the network's layers 1302, 1304, 1306, with each layer performing computations based on its weights, biases, and activation functions until the output layer 1306 produces the output.

The training data may be labeled with an expected output (e.g., a "ground-truth" such as the corresponding give an example of ground truth label). The output generated by the output layer 1306 is compared to the expected output from the training data to compute a loss function that measures the discrepancy between the predicted output and the expected output. In some embodiments, the negative gradient of the loss function may be computed with respect to the weights of each layer individually. This negative gradient is computed one layer at a time, iteratively backward from the output layer 1306 to the input layer 1302 of the neural network model. These gradients quantify the sensitivity of the network's output to changes in the parameters. The chain rule of calculus is applied to efficiently calculate these gradients by propagating the gradients backward (in a back propagation network) from the output layer 1306 to the input layer 1302.

Parameters of the neural network are updated backwardly from the output layer to the input layer (backpropagating) based on the computed negative gradient using an optimization algorithm to minimize the loss. The backpropagation from the last layer (output layer 1306) to the input layer 1302 may be conducted for a number of training samples in a number of iterative training epochs. In this way, parameters of the neural network models 224 may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. In a multiple neural network embodiment, the neural network models may be trained separately and then combined together and trained as a single neural network model.

Neural network parameters may be trained over multiple stages. For example, initial training (e.g., pre-training) may be performed on one set of training data, and then an additional training stage (e.g., fine-tuning) may be performed using a different set of training data, such as machine-readable code in one or more programming languages. In some embodiments, all or a portion of parameters of one or more neural-network models being used together may be frozen, such that the "frozen" parameters are not updated during that training phase. This may allow, for example, a smaller subset of the parameters to be trained without the computing cost of updating all the parameters.

Therefore, the training process transforms the neural network into an "updated" trained neural network with updated parameters such as weights, activation functions, and biases. The trained neural network thus improves neural network technology for generating machine-readable code from text specifying one or more rules.

Once training is complete, the trained neural network models 224 may enter an inference stage where the neural network models 224 may be used to make predictions on new, unseen data, such as determining classifiers that are associated with personalized additional content.

In various embodiments, and with respect to deployment of the neural network model(s), the neural network model(s) may be converted prior to deployment (e.g., within the system 200). In some embodiments, an intermediate model exchange format such as ONNX (Open Neural Network Exchange) is used to perform the conversion of the neural network model(s). By way of example, a model in Tensorflow/Pytorch format may be converted (e.g., by the intermediate model exchange format) to a Tensorflow Lite (tflite) or Pytorch Mobil format, which is more suitable for inference and edge devices such as present in the system 200. In another example, a model in Pytorch format may be converted (e.g., by the intermediate model exchange format) to a TorchScript format a TensorRT format, or other suitable format. In some cases, if the neural network model does not support conversion using the intermediate model exchange format (e.g., ONNX), then other options are available. In one example, the backbone model may be inspected and rewritten (at least in part) so that the model is compatible with the intermediate model exchange format. In another example, it may be possible to directly convert some neural network model(s) while bypassing the intermediate model exchange format.

Figure 14A:
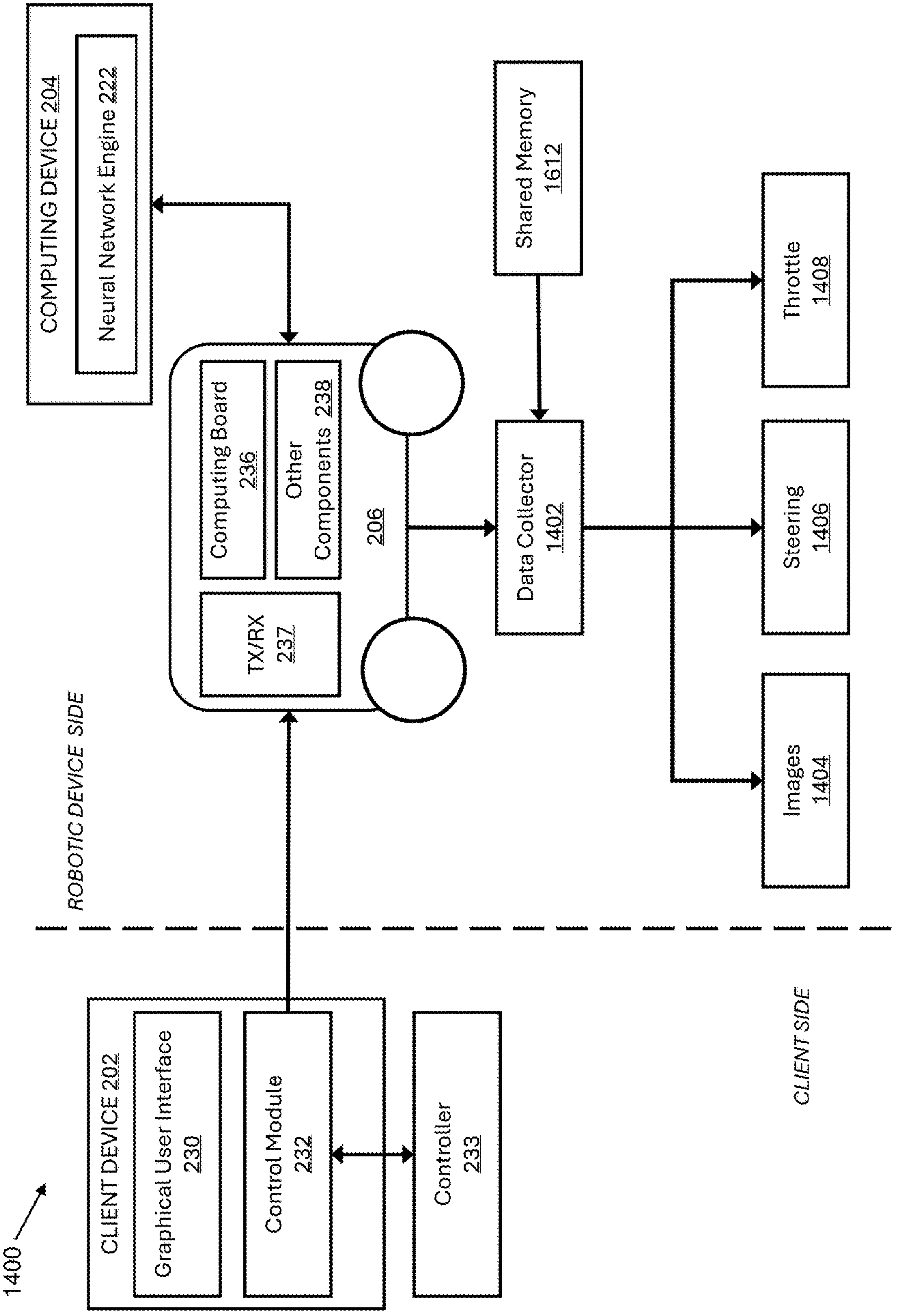
FIGS. 14A, 14B, and 14C illustrate exemplary data flow diagrams for controlling a robotic device, in accordance with some embodiments.
Figure 14B:
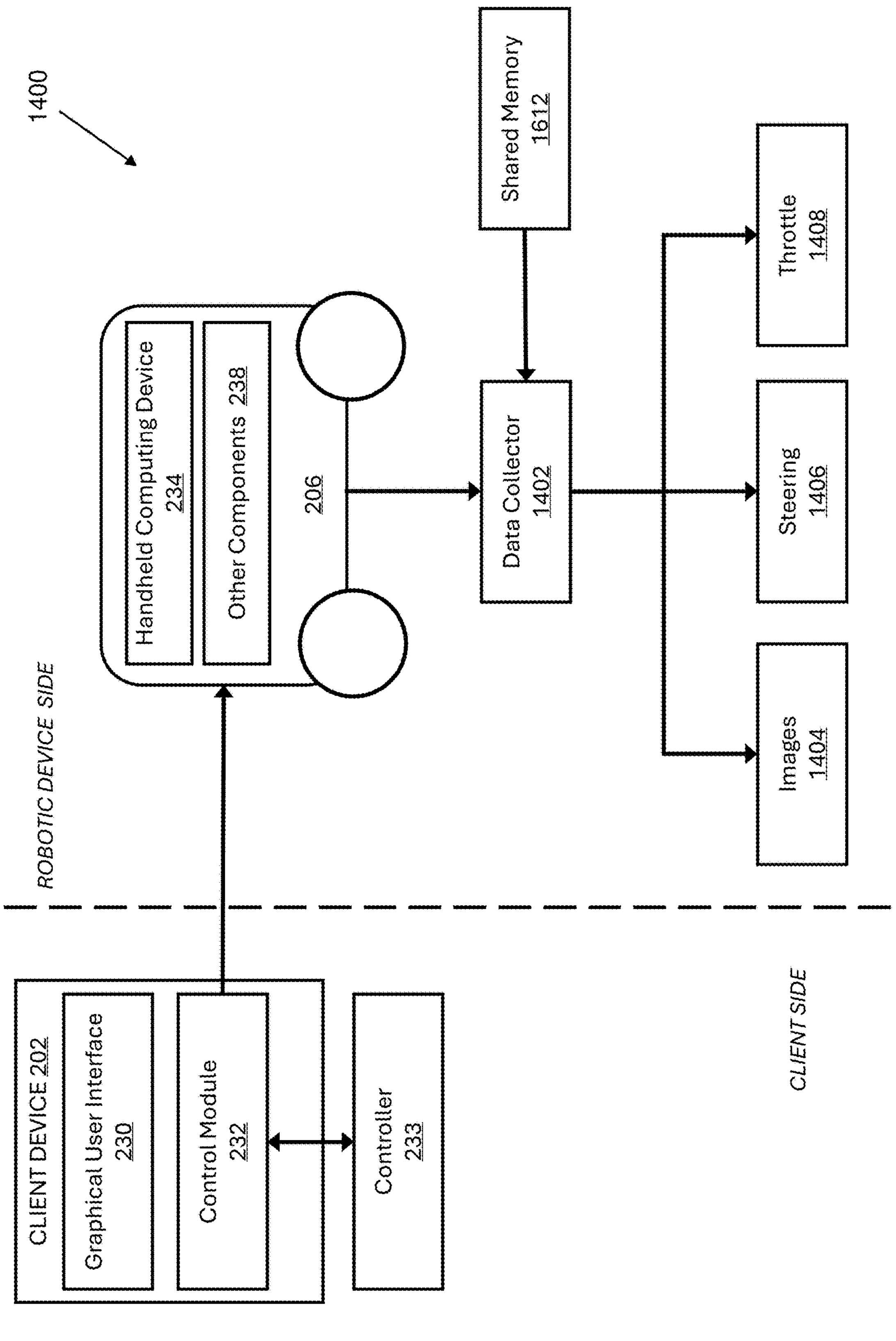
Figure 14C:
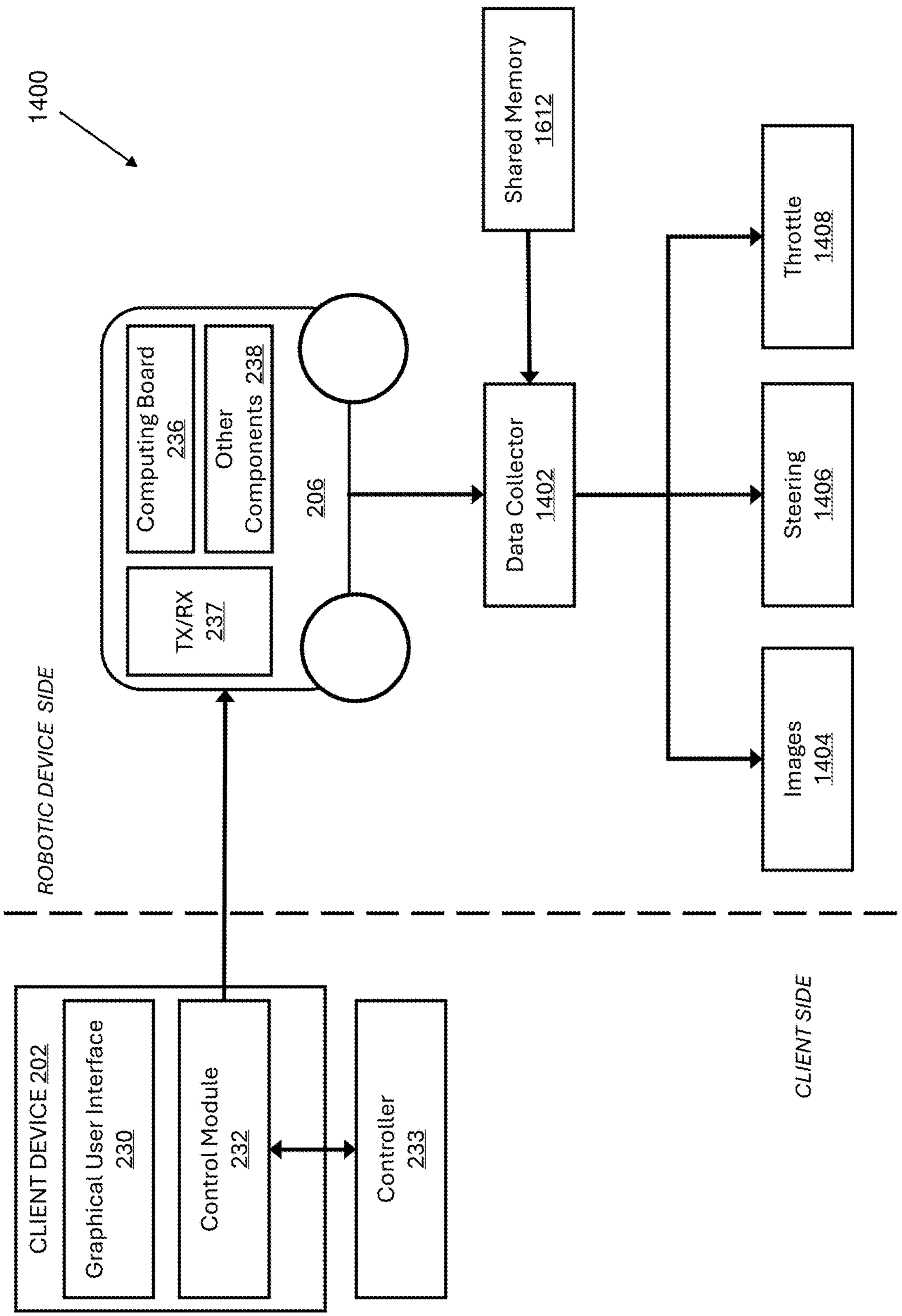

With reference now to FIGS. 14A, 14B, 14C, illustrated therein are exemplary data flow diagrams 1400 for controlling the robotic device 206. In some embodiments, the data flow diagrams 1400 may correspond to a remote control configuration of the system 200. Although it will be understood that the data flow diagrams 1400 may equally correspond to a local control configuration of the system 200. FIG. 14A corresponds to the system implementation of FIG. 2A, FIG. 14B corresponds to the system implementation of FIG. 2B, and FIG. 14C corresponds to the system implementation of FIG. 2C, described above. In each of FIGS. 14A, 14B, and 14C, illustrated therein is a "client side" of the data flow that includes the client device 202 with the graphical user interface 230 and the control module 232, discussed above. The example of FIGS. 14A, 14B, 14C further illustrate a controller 233 paired with, or otherwise coupled to, the client device 202 and in communication with the control module 232. The controller 233 may include any of the controllers discussed above, such as the controllers selectable via the drop-down menu 508 of the GUI 400 (see FIG. 5). In some embodiments, user inputs provided via the controller 233 may be communicated to the control module 232 and then to the robotic device 206 on a "robotic device side" of the data flow. For example, in the example of FIG. 14A, the inputs from client device 202 may be communicated to the computing board 236 via transceiver 237. Computing board 236 may also be in communication with the cloud-based computing device 204, for example via the transceiver 237. In addition, the computing board 236 may be in communication with a microcontroller board (other components 238), which in turn provides control signals to the robotic device 206 to control movements (e.g., steering and throttle) of the robotic device 206 from the client side. In the example of FIG. 14B, the inputs may be communicated to the handheld computing device 234, which may be in communication with a microcontroller board (other components 238), which in turn provides control signals to the robotic device 206 to control movements (e.g., steering and throttle) of the robotic device 206 from the client side. In the example of FIG. 14C, the inputs may be communicated to the computing board 236 via transceiver 237. The computing board 236 may also be in communication with a microcontroller board (other components 238), which in turn provides control signals to the robotic device 206 to control movements (e.g., steering and throttle) of the robotic device 206 from the client side. As shown in FIGS. 14A, 14B, 14C, in some embodiments and on the robotic device side, a data collector 1402 stores data collected by one or more of the sensors 210-218 (see FIG. 2A, 2C) or sensors 210A, 212A, 216A, 218A (see FIG. 2B). As previously discussed, the sensors 210-218 or the sensors 210A, 212A, 216A, 218A may collect data in real-time and/or at predefined time intervals, such as every 200 ms. In some embodiments, the data collector 1402 may also receive data from a shared memory 1612, as described in more detail below with reference to FIG. 16. In some cases, collected and stored data may include image data 1404, steering data 1406, and throttle data 1408, among others. The data may be stored in data structures or tuples (having the form: (image, steering, throttle)) that also include corresponding timestamps. In some cases, the data collector 1402 may reside in the handheld computing device 234, the computing board 236, or the computing device 204, such that the collected sensor data is stored in memory disposed within the handheld computing device 234, the computing board 236, or the computing device 204. Alternatively, or additionally, the data collector 1402 may include the database 228, in some cases.

Figure 15A:
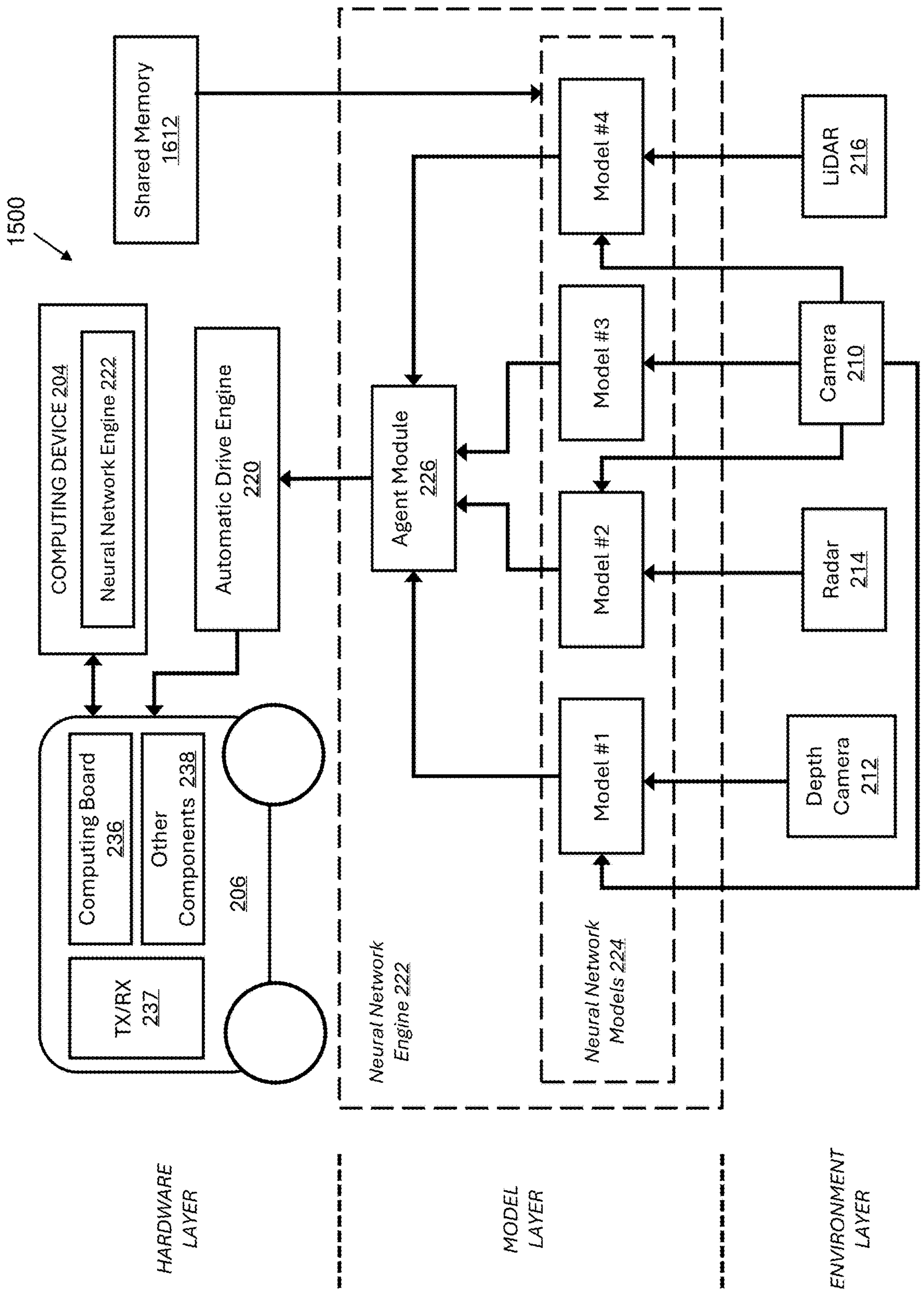
FIGS. 15A, 15B, and 15C illustrate exemplary data flow diagrams for autonomously controlling a robotic device, in accordance with some embodiments.
Figure 15B:
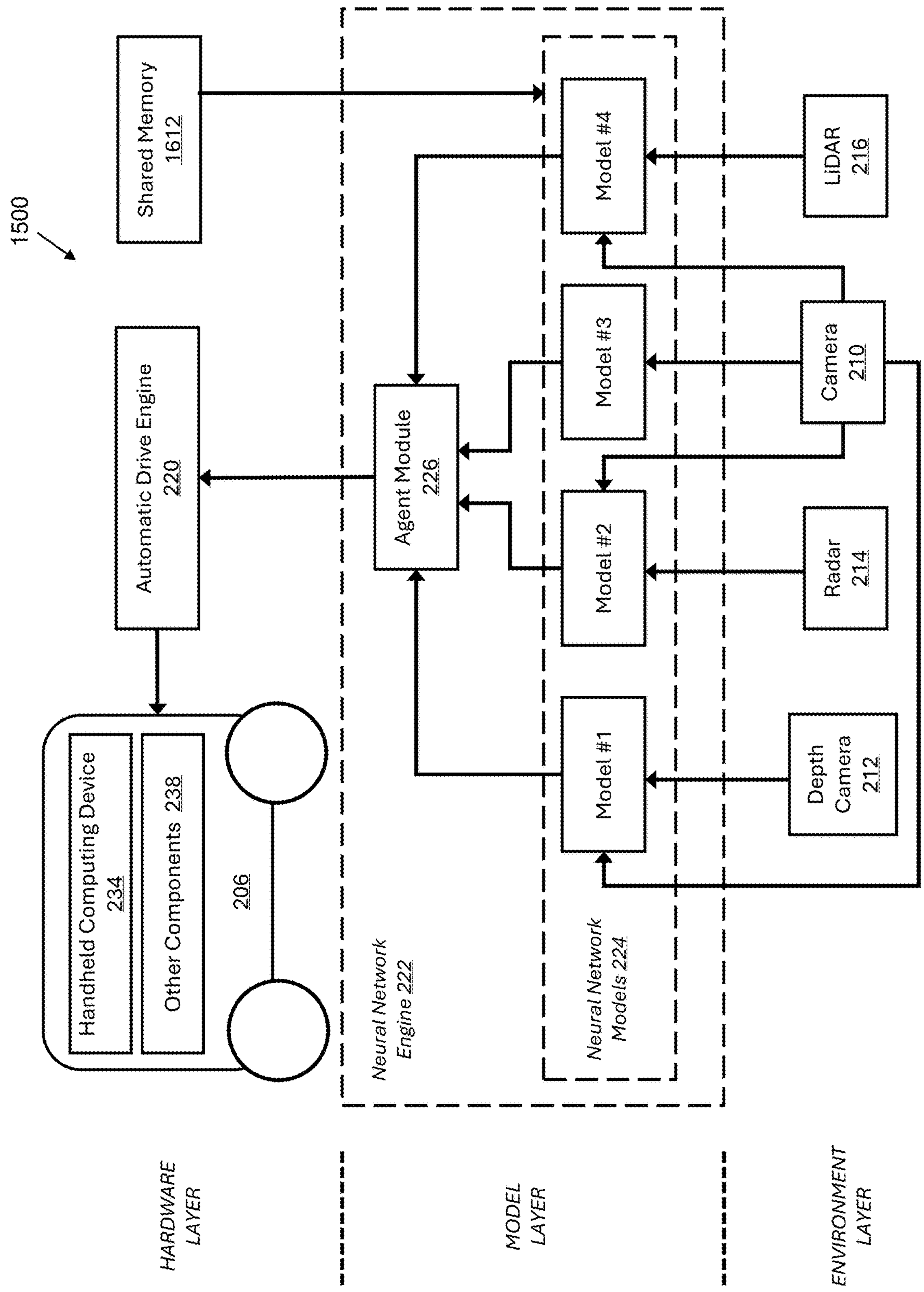
Figure 15C:
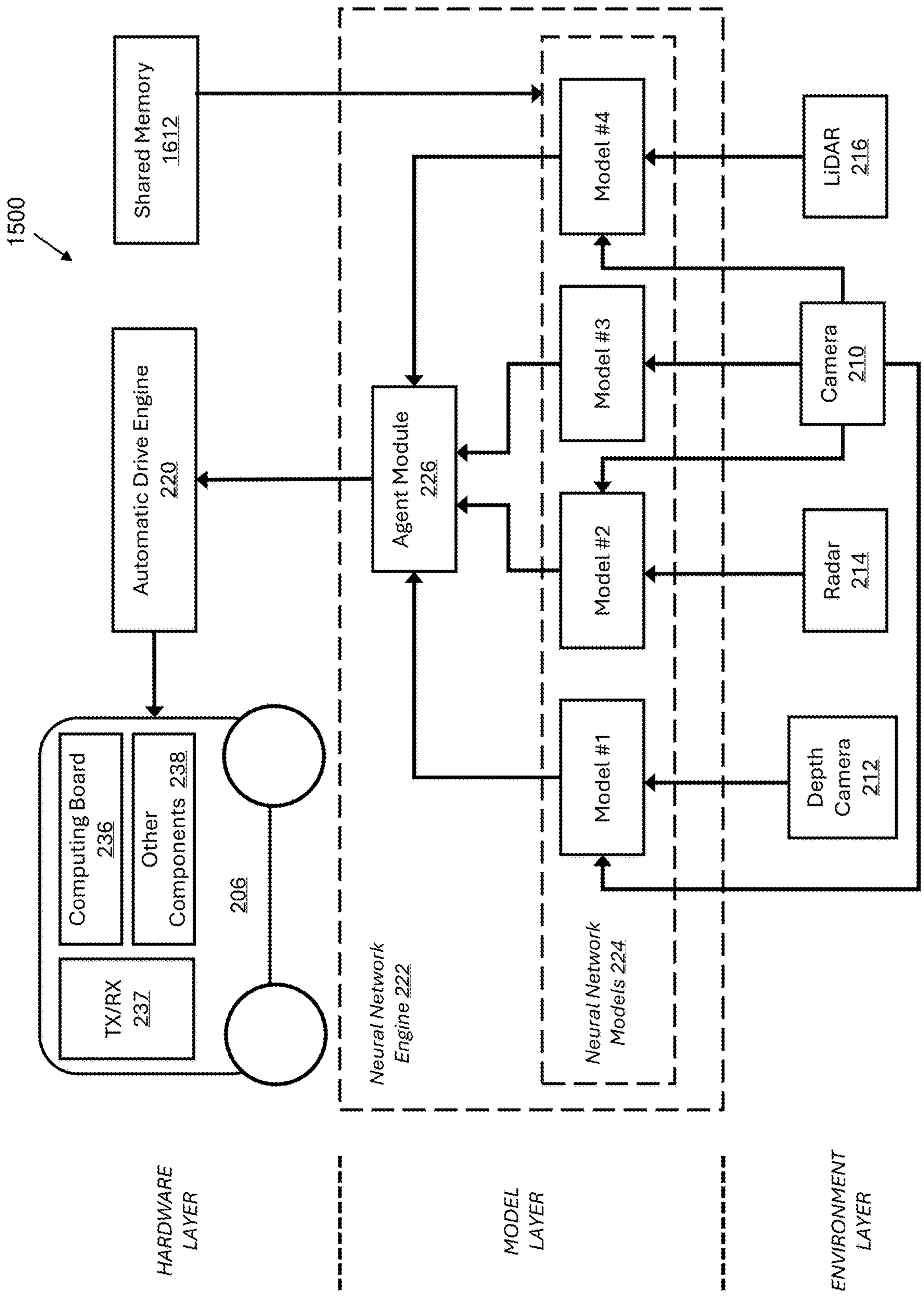

Referring to FIGS. 15A, 15B, 15C, illustrated therein are exemplary data flow diagrams 1500 for controlling the robotic device 206. In some embodiments, the data flow diagrams 1500 may correspond to autonomous control of the robotic device 206 using the autodrive feature. Generally, as previously discussed, when the autodrive feature is active, the robotic device 206 may be controlled using the neural network engine 222 and the automatic drive engine 220. FIG. 15A corresponds to the system implementation of FIG. 2A, FIG. 15B corresponds to the system implementation of FIG. 2B, and FIG. 15C corresponds to the system implementation of FIG. 2C, described above. In each of FIGS. 15A, 15B, and 15C, illustrated therein is a "hardware layer", a "model layer", and an "environment layer" of the data flow. In the example of FIG. 15A, the "hardware layer" includes robotic device 206 (with computing board 236), the automatic drive engine 220, computing device 204 (e.g., cloud-based computing device 204), and shared memory 1612. While illustrated in this example as being separate, it will be understood that the automatic drive engine 220 may be part of the computing device 204, as described above with reference to FIG. 2A. In the example of FIG. 15B, the "hardware layer" includes the robotic device 206 (with handheld computing device 234), the automatic drive engine 220, and the shared memory 1612. In the example of FIG. 15C, the "hardware layer" includes the robotic device 206 (with computing board 236), the automatic drive engine 220, and the shared memory 1612. In each of FIGS. 15A, 15B, 15C, the "model layer" of the data flow includes the agent module 226 and the plurality of neural network models 224, and the "environment layer" of the data flow includes the sensors 210-218, including sensors 210A, 212A, 216A, 218A (although only sensors 210-216 are illustrated) that may be used to determine the location of the robotic device 206, determine speed, throttle data, direction data, etc. of the robotic device 206, and/or determine features of the environment surrounding the robotic device 206 (e.g., including static (fixed) and/or dynamic (moving) obstacles in the environment). In various implementations, such as shown and described with reference to FIGS. 2A, 2B, 2C and in correspondence with the examples of FIGS. 15A, 15B, 15C, the neural network engine 222 and the automatic drive engine 220 may reside in the cloud-based computing device 204 (FIG. 2A, 15A), the handheld computing device 234 mounted on the robotic device 206 (FIG. 2B, 15B), or the computing board 236 mounted on the robotic device 206 (FIG. 2C, 15C).

In the present example, the model layer includes four (4) different models (Model #1, Model #2, Model #3, and Model #4). However, it will be understood that in other embodiments, more models or less models may equally be used. The different models in the model layer may include a variety of different types of models configured to perform a variety of different tasks. In some examples, the various models may include various CNNs, such as previously described. In some cases, the various models may be configured to perform tasks such as image classification, determining steering angles and/or throttle, behavior cloning, etc. In some embodiments, two or more of the various models may be configured to perform the same task, where each of the two or more models may have different performance metrics such as different latency (e.g., amount of time to produce a prediction for a single input), different throughput (e.g., total number of predictions for a given amount of time), and/or different accuracy (e.g., such as different values of mean average precision, mAP, or other accuracy metric). In addition, the various models may be trained, or otherwise modified or optimized, using one or more of the methods described above. As shown, and in various embodiments, each neural network model (Model #1, Model #2, Model #3, and Model #4) of the plurality of neural network models 224 may receive a subset of data from one or more of the sensors. In the illustrated example, Model #1 receives depth camera data from the depth camera 212, Model #2 receives radar data from the radar 214 and image/video data from the camera 210, Model #3 receives image/video data from the camera 210, and Model #4 receives image/video data from the camera 210 and LiDAR data from the LiDAR 216. In turn, each of the neural network models (Model #1, Model #2, Model #3, and Model #4) generates an output that includes steering data and/or throttle data. It is noted that the subset of data received by each neural network model may be different from subsets of data received by the other neural network models as each subset of data may include data from different combinations of sensors. Further, the exemplary subsets of data shown in FIGS. 15A, 15B, 15C are merely exemplary, and in other embodiments, different subsets of data may be provided to one or more of the neural network models (Model #1, Model #2, Model #3, and Model #4). In some examples, one or more of the neural network models (Model #1, Model #2, Model #3, and Model #4) may also receive data from the shared memory 1612, described in more detail below. As a result, the plurality of neural network models may synchronously process video and/or image data provided by the shared memory 1612 (in addition respective subsets of data received from one or more of the sensors). In some embodiments, the outputs from each of the neural network models is provided to the agent module 226. Thereafter, the agent module 226 may select an output of one of the neural network models (Model #1, Model #2, Model #3, and Model #4) and transmit the selected output to the automatic drive engine 220. As merely one example, and in some cases, the agent module 226 may select an output based on a target task for the robotic device 206, where the target task may include tasks such as path planning/path following, lane keeping, obstacle detection/avoidance, racing, following, overtaking, traffic sign recognition, etc. In other examples, the agent module 226 may select an output based on the model that has the best performance metric (e.g., such as latency, throughput, and/or accuracy) for a given task. For instance, if two or more models are configured to perform a same task, in some embodiments, the agent module 226 may select the output based on a best performance metric for the two or more models for performing the same task. In some cases, better model accuracy may be desired as compared to faster model speed, or vice versa. In still other examples, various other criteria may instead be used by the agent module 226 to select the output of the one of the neural network models. The automatic drive engine 220, having received the selected output from the agent module 226, may convert the steering and/or throttle data received from the agent module 226 into control data that is provided to the robotic device 206 to control the robotic device 206. In some embodiments, the steering and/or throttle data is converted into one or more Robot Operating System (ROS) control signals that are provided to the robotic device 206. In various embodiments, this process may repeat iteratively to control the driving direction and speed of the robotic device 206.

In various embodiments, a user may seamlessly switch between remote (or local) control of the robotic device 206 (e.g., as described with respect to the data flow diagram 1400 of FIGS. 14A, 14B, 14C) and autonomous control of the robotic device 206 (e.g., as described with respect to the data flow diagram 1500 of FIGS. 15A, 15B, 15C). In some cases, such switching may occur on-the-fly, while the robotic device 206 is in operation. This may be described as an example of hot swapping, in some embodiments. Recalling the drive window 502 of the GUI 400, and in some embodiments, the user may seamlessly activate or deactivate the autodrive feature to switch between remote (or local) control of the robotic device 206 and autonomous control of the robotic device 206. In some embodiments, such as when the robotic device 206 includes the computing board 236 and the handheld computing device 234, switching between remote (or local) control and autonomous control may also cause different ones of the computing board 236 and the handheld computing device 234 to effectuate control of the robotic device 206 (e.g., by providing control signals to the robotic device 206). As merely one example, remote (or local) control of the robotic device 206 may employ a microcontroller board (e.g., such as an Arduino board) used in conjunction with a computing board 236 (e.g., such as a Jetson Nano board) or a handheld computing device 234. Autonomous control of the robotic device 206 may provide similar hardware options, but may receive control signals via the neural network engine 222/automatic drive engine 220, as previously described. Separately, it is further noted that in some embodiments, other settings/features which have been previously described may similarly be changed, enabled, or disabled on-the-fly, and in some cases, while the robotic device 206 is in operation. This may be described as a further example of hot swapping, in some embodiments.

Figure 16:
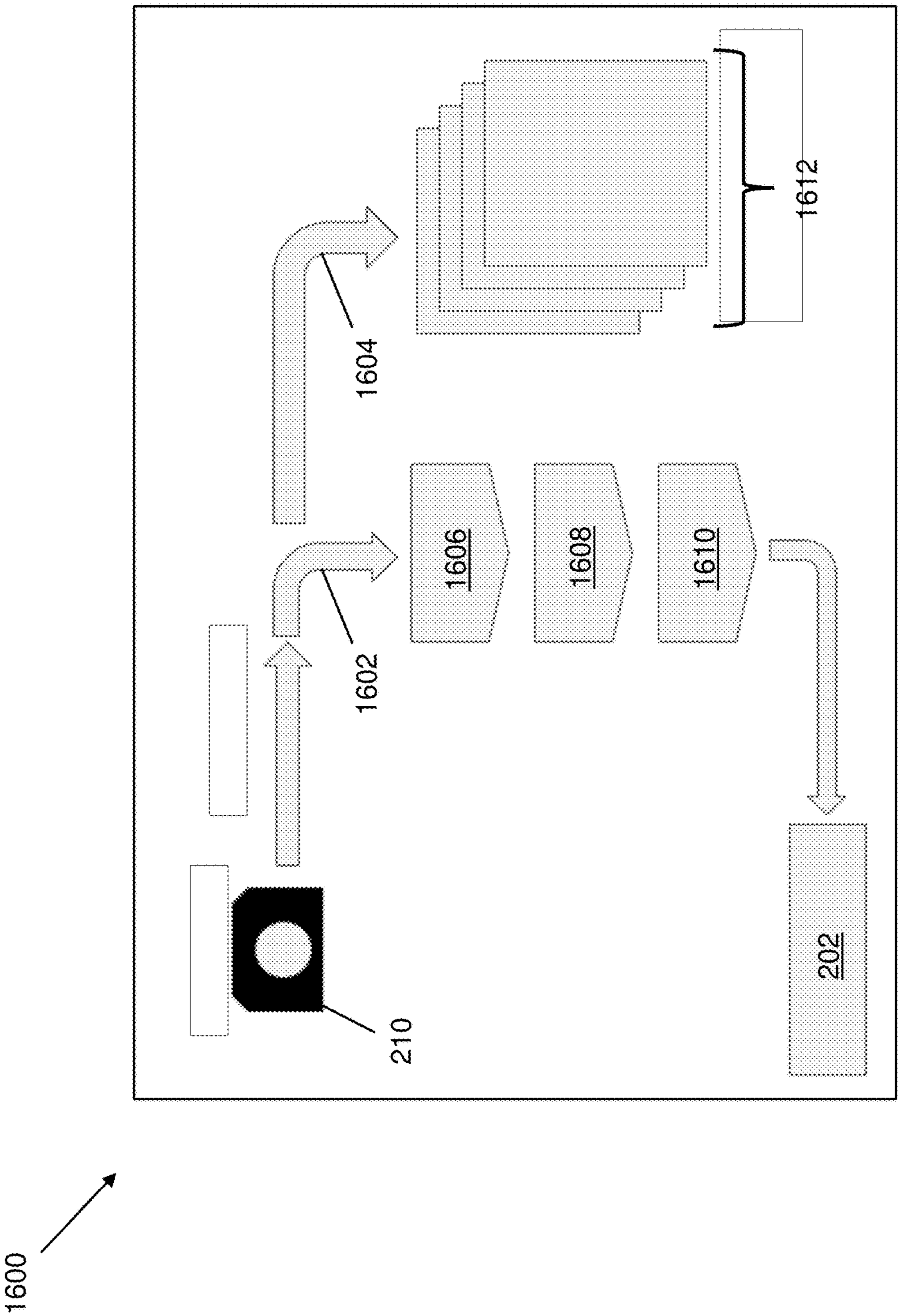
FIG. 16 illustrates an exemplary video/image stream data flow diagram, in accordance with some embodiments.

Elaborating on data provided by the camera 210 and collected by the data collector (FIGS. 14A, 14B, 14C) and/or provided to neural network models 224 (FIGS. 15A, 15B, 15C), reference is made to FIG. 16, which provides a video/image stream data flow diagram 1600. In various embodiments, video and/or image data captured by the camera 210 may be processed by a pipeline-based multimedia framework (e.g., such as GStreamer). As part of the processing, the video and/or image data captured by the camera 210 may be split into multiple data paths such as data paths 1602, 1604.

Data path 1602 includes an encoder 1606, a packetizer 1608, and a transport socket 1610. The encoder 1606 performs encoding of the video and/or image data. In some embodiments, the encoder 1606 may include an H.264 codec (also referred to as advanced video coding, AVC). In other cases, the encoder 1606 may include an H.265 codec (also referred to as high efficiency video coding, HEVC). After encoding of the video and/or image data, the packetizer 1608 may create real-time transport protocol (RTP) packets using the encoded video and/or image data. In various examples, use of an RTP protocol provides for a low-latency stream. After creating the RTP packets, the transport socket 1610 may be used to send the RTP packets to the client device 202, for example, for display of a video stream and/or images via the GUI 230 (or the GUI 400) of the client device 202. In some embodiments, the transport socket 1610 may include a user datagram protocol (UDP) socket. Alternatively, in some cases, the transport socket 1610 may include a transmission control protocol (TCP) socket.

Data path 1604 may include a shared memory 1612. In various embodiments, the video and/or image data may thus also be provided to the shared memory 1612 for storage therein. In some embodiments, the shared memory 1612 includes memory that resides in the handheld computing device 234, the computing board 236, or the computing device 204 such that the video and/or image data is stored in the memory disposed within the handheld computing device 234, the computing board 236, or the computing device 204. Alternatively, or additionally, the shared memory 1612 may include the database 228, in some embodiments. In yet other embodiments, the shared memory 1612 may include memory that resides at another local or remote location and is in communication with the data collector (FIGS. 14A, 14B, 14C) and/or the neural network models 224 (FIGS. 15A, 15B, 15C). In various embodiments, the shared memory 1612 may provide the video and/or image data stored therein to any of a plurality of system modules or components for synchronous processing. For example, the shared memory 1612 may provide the video and/or image data stored therein to the data collector 1402 (FIGS. 14A, 14B, 14C), as previously described. Further, in some embodiments, the shared memory 1612 may provide the video and/or image data stored therein as inputs to one or more of the neural network models 224 (e.g., such as the Model #1, Model #2, Model #3, and Model #4 discussed above with reference to FIGS. 15A, 15B, 15C) for synchronous processing by the one or more neural network models 224.

Figure 17:
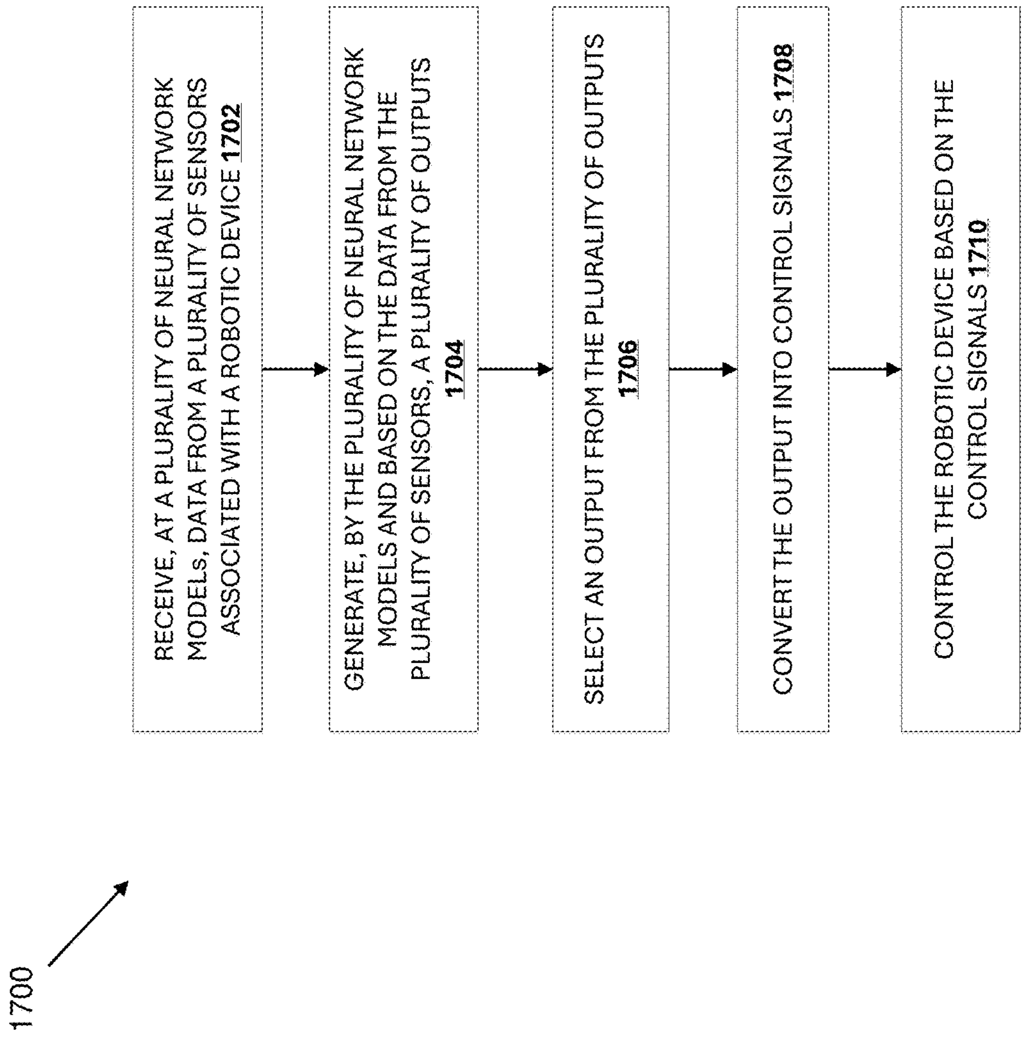
FIG. 17 illustrates an embodiment of a method for controlling a self-driving robot, in accordance with some embodiments.

In view of the above discussion, and with reference to FIG. 17, illustrated therein is an embodiment of a method 1700 for controlling a self-driving robot. It will be understood that additional steps may be performed before, during, and/or after the steps described below with reference to the method 1700. In addition, while the steps of the method 1700 are shown as occurring serially (e.g., one after another), two or more of the steps of the method 1700 may occur in parallel. Further, the steps of the method 1700 need not be performed in the order shown and/or one or more of the steps of the method 1700 need not be performed. Various aspects of the method 1700 may be described with reference to the systems, devices, sensors, neural network engine, automatic drive engine, and/or other components described above. Thus, one or more aspects discussed above with reference to FIGS. 1, 2A, 2B, 2C, 3-8, 9A, 9B, 10-12, 13A, 13B, 14A, 14B, 14C, 15A, 15B, 15C, and 16 may also apply to the method 1700.

The method 1700 begins at block 1702 where data from a plurality of sensors (e.g., such as the sensors 210-218, including sensors 210A, 212A, 216A, 218A) associated with a robotic device (e.g., such as the robotic device 206) are received by a plurality of neural network models 224. In some embodiments, one or more of the neural network models 224 may also receive video and/or image data from the shared memory 1612, as described above. In various embodiments, the plurality of neural network models 224 may be configured to perform a variety of tasks, and the various models may be trained, or otherwise modified or optimized, using one or more of the methods described above. In some embodiments, each neural network model of the plurality of neural network models 224 may receive a subset of data from a different subset of sensors of the plurality of sensors (and in some cases from the shared memory 1612).

The method 1700 then proceeds to block 1704 where a plurality of outputs are generated by the plurality of neural network models 224 based on the data received from the plurality of sensors (and in some cases from the shared memory 1612). In various embodiments, each particular neural network model of the plurality of neural network models 224 may generate an output that corresponds to a respective subset of data received by the particular neural network model of the plurality of neural network models 224. In some embodiments, the output generated by each of the plurality of neural network models 224 may include steering data and/or throttle data.

The method 1700 then proceeds to block 1706 where an output is selected from a plurality of outputs. In particular, and in some cases, the outputs from each of the plurality of neural network models 224 are provided to an agent module (e.g., such as the agent module 226), and the agent module may select a particular output from the plurality of outputs provided by the plurality of neural network models 224. The agent module may use a variety of different criteria to select the output, in accordance with various embodiments. For example, in some cases, the agent module may select an output based on a target task for the robotic device 206, as described above. In other examples, the agent module may select an output based on the model that has the best performance metric for a given task, as described above. In still other examples, various other criteria may instead be used by the agent module to select the output of the one of the neural network models.

The method 1700 then proceeds to block 1708 where the output selected by the agent module is converted into one or more control signals. In some embodiments, the selected output is provided to an automatic drive engine (e.g., such as the automatic drive engine 220). In various example, after the automatic drive engine receives the selected output from the agent module, the automatic drive engine may convert the received steering and/or throttle data into control data (e.g., such as ROS control signals, in some cases).

The method 1700 then proceeds to block 1710 where the robotic device 206 is controlled based on the control signals. For instance, in various embodiments, after the automatic drive engine converts the steering and/or throttle data into control data, the control data may be provided to the robotic device 206 to control the robotic device 206. In some cases, it may also be said that the robotic device 206 is controlled by the output selected by the agent module (which is subsequently converted into the one or more control signals). In various embodiments, this process steps of the method 1700 may be repeated iteratively to control the driving direction and speed of the robotic device 206, as previously described.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:

a non-transitory computer-readable memory; and one or more hardware processors coupled to the non-transitory computer-readable memory and configured to read instructions from the non-transitory computer-readable memory to cause the system to perform operations comprising:

receiving, at a plurality of neural network models, data from a plurality of sensors associated with a robotic device, wherein each neural network model of the plurality of neural network models receives a subset of the data from a different subset of sensors of the plurality of sensors;

generating, by the plurality of neural network models and based on the data from the plurality of sensors, a plurality of outputs, wherein each output of the plurality of outputs is generated by a particular neural network model of the plurality of neural network models and comprises steering data and throttle data, and wherein each output corresponds to a respective subset of data received by the particular neural network model of the plurality of neural network models;

selecting, by an agent module in communication with the plurality of neural network models, one or more outputs from the plurality of outputs based on a performance metric for each of two or more neural network models of the plurality of neural network models that are configured to perform a same task associated with controlling the robotic device, the selected one or more outputs comprising the steering data and the throttle data generated by a respective one of the two or more neural network models; and controlling the robotic device based on the selected one or more outputs.

2. The system of claim 1, wherein the operations further comprise:

converting the selected one or more outputs into control signals; and controlling the robotic device based on the control signals.

3. The system of claim 2, wherein the converting the selected one or more outputs into the control signals further comprises providing the selected one or more outputs to an automatic drive engine for conversion of the steering data and the throttle data into the control signals.

4. The system of claim 1, wherein the subset of data received by respective first and second models of the plurality of neural network models is different.

5. The system of claim 1, wherein the data is received from the plurality of sensors in real-time or at predefined time intervals.

6. The system of claim 1, wherein the selecting the one or more outputs is performed by the agent module based on a target task for the robotic device.

7. The system of claim 1, wherein at least some of the plurality of neural network models are configured to perform different tasks associated with the controlling the robotic device.

8. The system of claim 1, wherein at least some of the plurality of neural network models comprise models trained using a plurality of data augmentation transformations.

9. The system of claim 1, wherein a neural network engine comprises the plurality of neural network models and the agent module, and wherein the robotic device comprises the neural network engine.

10. The system of claim 1, wherein a neural network engine comprises the plurality of neural network models and the agent module, and wherein the robotic device is configured to communicate with the neural network engine over a network.

11. A method, comprising:

receiving, at a plurality of neural network models, data from a plurality of sensors associated with a robotic device, wherein each neural network model of the plurality of neural network models receives a subset of the data from a different subset of sensors of the plurality of sensors;

generating, by the plurality of neural network models and based on the data from the plurality of sensors, a plurality of outputs, wherein each output of the plurality of outputs is generated by a particular neural network model of the plurality of neural network models and comprises steering data and throttle data, and wherein each output corresponds to a respective subset of data received by the particular neural network model of the plurality of neural network models;

selecting, by an agent module in communication with the plurality of neural network models, one or more outputs from the plurality of outputs based on a performance metric for each of two or more neural network models of the plurality of neural network models that are configured to perform a same task associated with controlling the robotic device, the selected one or more outputs comprising the steering data and the throttle data generated by a respective one of the two or more neural network models; and controlling the robotic device based on the selected one or more outputs.

12. The method of claim 11, further comprising:

converting the selected one or more outputs into control signals; and controlling the robotic device based on the control signals.

13. The method of claim 12, wherein the converting the selected one or more outputs into the control signals further comprises providing the selected one or more outputs to an automatic drive engine for conversion of the steering data and the throttle data into the control signals.

14. The method of claim 11, wherein the subset of data received by respective first and second models of the plurality of neural network models is different.

15. The method of claim 11, wherein at least some of the plurality of neural network models are configured to perform different tasks associated with the controlling the robotic device.

16. The method of claim 11, wherein at least some of the plurality of neural network models comprise models trained using a plurality of data augmentation transformations.

17. The method of claim 11, wherein a neural network engine comprises the plurality of neural network models and the agent module, and wherein the robotic device comprises the neural network engine or is configured to communicate with the neural network engine over a network.

18. A non-transitory machine-readable medium having stored thereon machine-readable instructions executable to cause a machine to perform operations comprising:

receiving, at a plurality of neural network models, data from a plurality of sensors associated with a robotic device, wherein each neural network model of the plurality of neural network models receives a subset of the data from a different subset of sensors of the plurality of sensors;

generating, by the plurality of neural network models and based on the data from the plurality of sensors, a plurality of outputs, wherein each output of the plurality of outputs is generated by a particular neural network model of the plurality of neural network models and comprises steering data and throttle data, and wherein each output corresponds to a respective subset of data received by the particular neural network model of the plurality of neural network models;

selecting, by an agent module in communication with the plurality of neural network models, one or more outputs from the plurality of outputs based on a performance metric for each of two or more neural network models of the plurality of neural network models that are configured to perform a same task associated with controlling the robotic device, the selected one or more outputs comprising the steering data and the throttle data generated by a respective one of the two or more neural network models; and controlling the robotic device based on the selected one or more outputs.

19. The non-transitory machine-readable medium of claim 18, wherein the operations further comprise:

converting the selected one or more outputs into control signals; and controlling the robotic device based on the control signals.

20. The non-transitory machine-readable medium of claim 19, wherein the converting the selected one or more outputs into the control signals further comprises providing the selected one or more outputs to an automatic drive engine for conversion of the steering data and the throttle data into the control signals.

* * * * *